US010845976B2

(12) United States Patent
Simmons et al.

(10) Patent No.: US 10,845,976 B2
(45) Date of Patent: Nov. 24, 2020

(54) SYSTEMS AND METHODS FOR REPRESENTING DATA, MEDIA, AND TIME USING SPATIAL LEVELS OF DETAIL IN 2D AND 3D DIGITAL APPLICATIONS

(71) Applicant: IMMERSIVE SYSTEMS INC., Pittsburgh, PA (US)

(72) Inventors: Jason Simmons, Pittsburgh, PA (US); Maksim Galkin, Kamyshin (RU)

(73) Assignee: IMMERSIVE SYSTEMS INC., Pittsburgh, PA (US)

(*) Notice: Subject to any disclaimer, the term of this patent is extended or adjusted under 35 U.S.C. 154(b) by 0 days.

(21) Appl. No.: 16/107,466

(22) Filed: Aug. 21, 2018

(65) Prior Publication Data

US 2019/0056856 A1 Feb. 21, 2019

Related U.S. Application Data

(60) Provisional application No. 62/547,917, filed on Aug. 21, 2017.

(51) Int. Cl.
*G06F 3/0484* (2013.01)
*G06F 3/0488* (2013.01)
(Continued)

(52) U.S. Cl.
CPC .......... *G06F 3/04847* (2013.01); *G06F 3/013* (2013.01); *G06F 3/017* (2013.01); *G06F 3/0482* (2013.01); *G06F 3/0484* (2013.01); *G06F 3/04817* (2013.01); *G06F 3/04883* (2013.01); *G06F 3/167* (2013.01); *G06F 16/34* (2019.01); *G06F 2203/04806* (2013.01); *G06F 2203/04808* (2013.01)

(58) Field of Classification Search
CPC .. G06F 3/04847; G06F 3/04883; G06F 3/167; G06F 3/017; G06F 3/04817; G06F 3/0482; G06F 3/013; G06F 3/0484; G06F 2203/04806; G06F 2203/04808; G06F 16/34
See application file for complete search history.

(56) References Cited

U.S. PATENT DOCUMENTS

| 2005/0033758 A1* | 2/2005 | Baxter ................... G11B 27/28 |
| 2006/0206339 A1* | 9/2006 | Silvera ................. G11B 27/105 |
| | | 704/278 |
| 2017/0010788 A1* | 1/2017 | Srinivasaraghavan ..................... H04N 21/4828 |

* cited by examiner

*Primary Examiner* — Ajay M Bhatia
*Assistant Examiner* — Mong-Shune Chung
(74) *Attorney, Agent, or Firm* — Platinum Intellectual Property LLP; Adam T. Hipp

(57) ABSTRACT

Approaches provide for navigating or otherwise interacting with content in response to input from a user, including voice inputs, device inputs, gesture inputs, among other such inputs such that a user can quickly and easily navigate to different levels of detail of content. This can include, for example, presenting content (e.g., images, multimedia, text, etc.) in a particular layout, and/or highlighting, emphasizing, animating, or otherwise altering in appearance, and/or arrangement of the interface elements used to present the content based on a current level of detail, where the current level of detail can be determined by data selection criteria associated with a magnification level and other such data. As a user interacts with the computing device, for example, by providing a zoom input, values of the selection criteria can be updated, which can be used to filter and/or select content for presentation.

20 Claims, 12 Drawing Sheets

(51) Int. Cl.
*G06F 3/16* (2006.01)
*G06F 3/01* (2006.01)
*G06F 3/0481* (2013.01)
*G06F 3/0482* (2013.01)
*G06F 16/34* (2019.01)

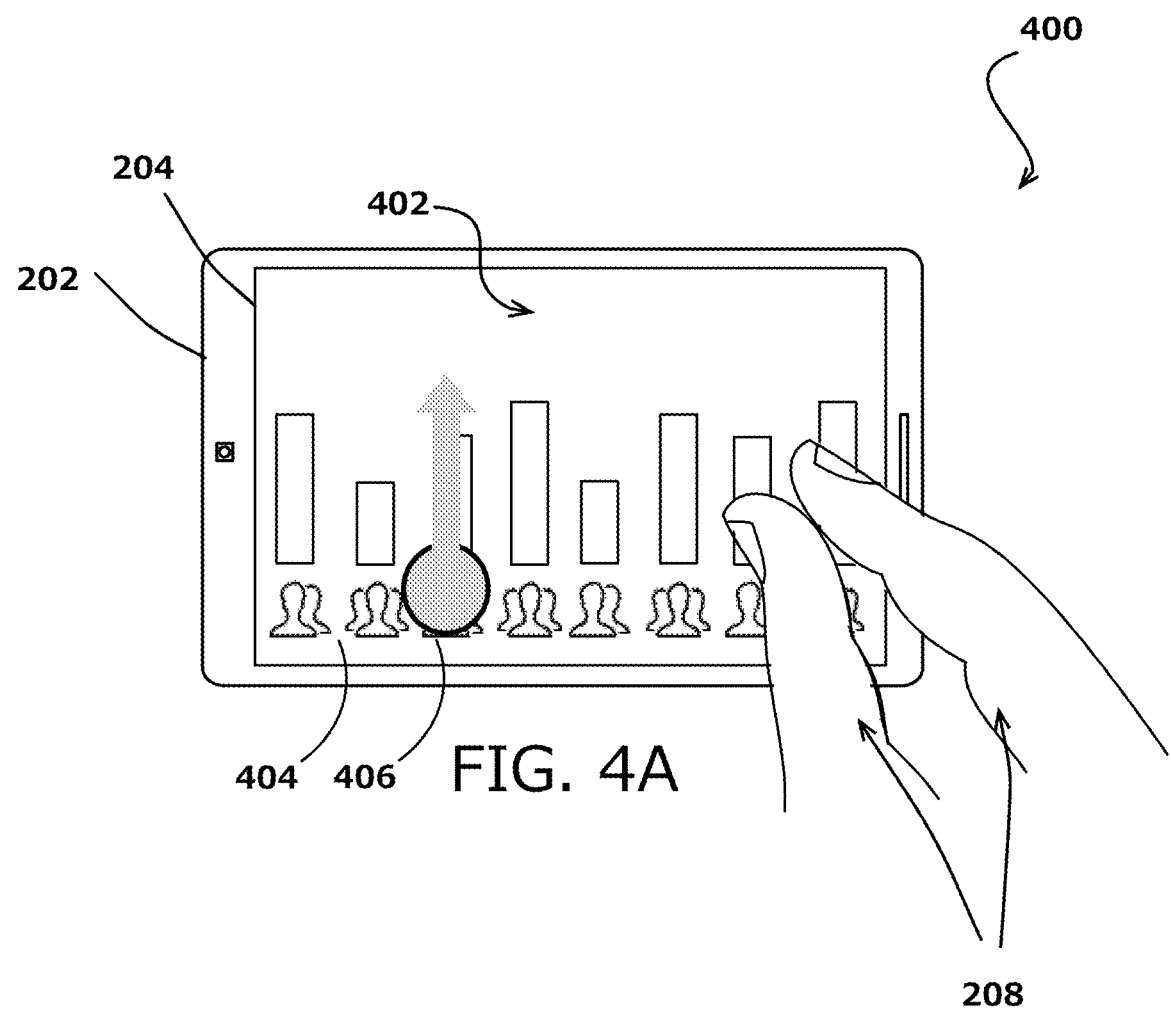

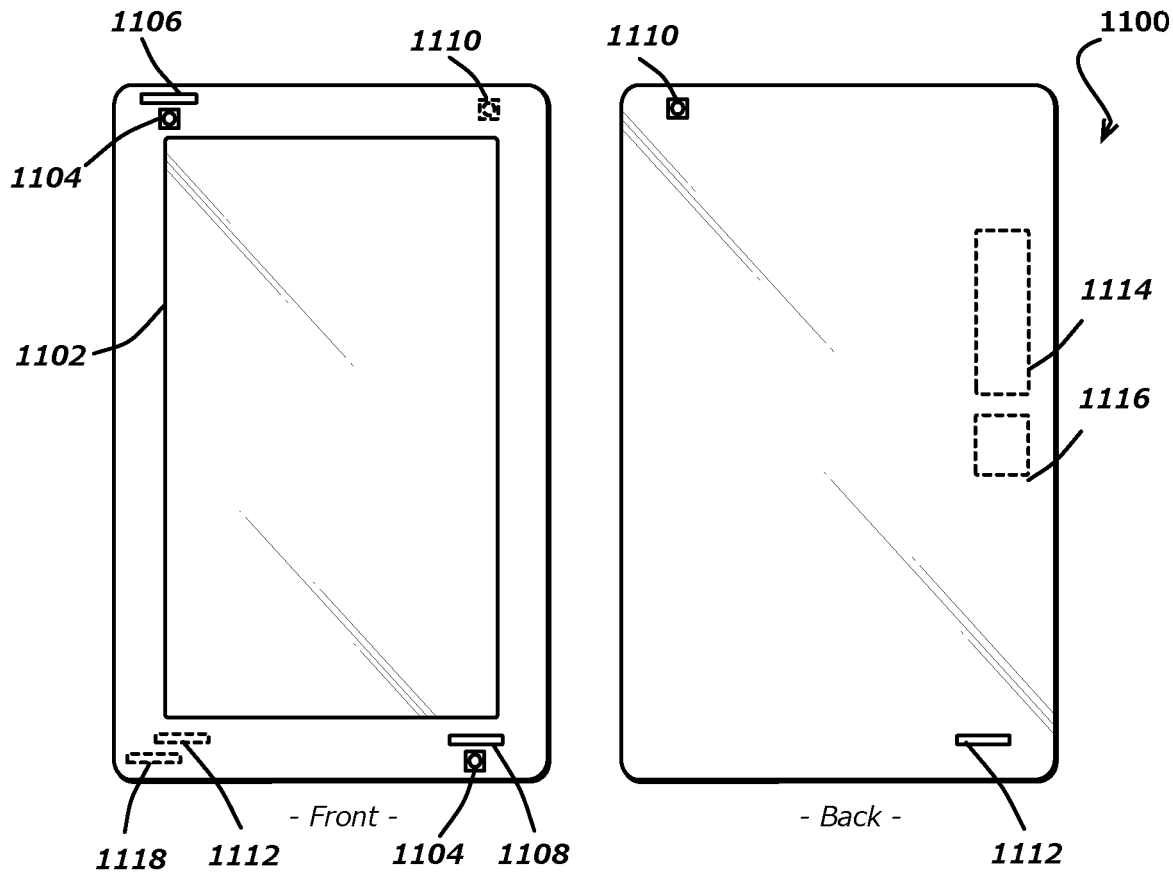
FIG. 11A
FIG. 11B
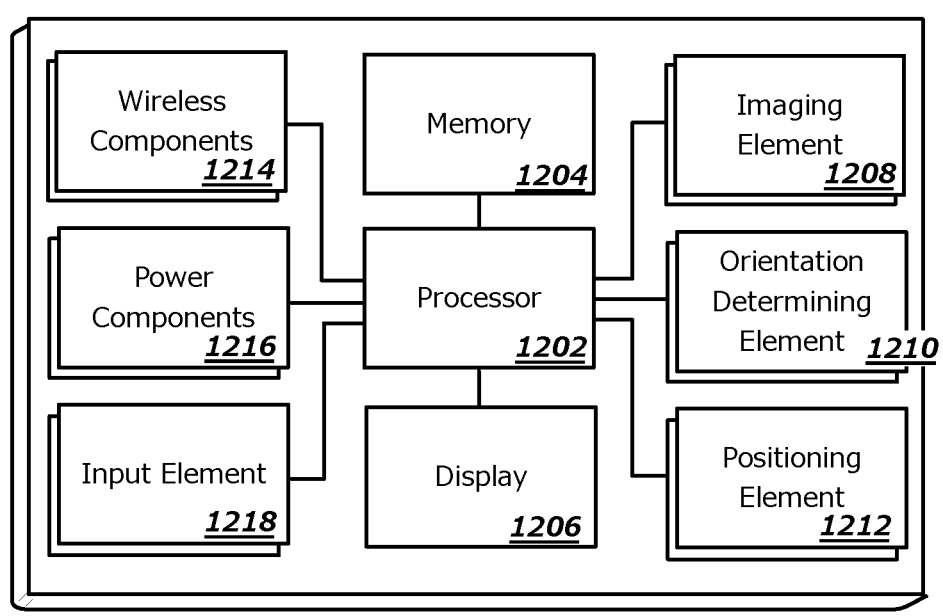
FIG. 12

SYSTEMS AND METHODS FOR REPRESENTING DATA, MEDIA, AND TIME USING SPATIAL LEVELS OF DETAIL IN 2D AND 3D DIGITAL APPLICATIONS

CROSS REFERENCE TO RELATED APPLICATIONS

The present application claims priority to U.S. provisional application No. 62/547,917, filed Aug. 21, 2017, and entitled "SYSTEMS AND METHODS FOR REPRESENTING DATA, MEDIA, AND TIME USING SPATIAL LEVELS OF DETAIL IN 2D AND 3D DIGITAL APPLICATIONS", which is hereby incorporated herein in its entirety for all purposes.

BACKGROUND

People are increasingly interacting with computers and other electronic devices to perform a wide variety of tasks. Mobile devices, including phones and tablets with multi-touch screens, have replaced desktop and laptop personal computers as the primary devices with which many people perform these tasks. In order to help users to navigate applications and perform these tasks in more intuitive and user-friendly ways, interfaces are increasingly providing new mobile-optimized views and types of interactivity. These approaches include navigation techniques such as animating screens of content on an imaginary two-dimensional (2D) plane perpendicular to the device, so that the user can utilize various swipe gestures to move between screens. While such approaches can enhance a user's experience in interacting with such content, in many situations the content is identical to content as presented through previous technology such as television and printed newspapers. For example, sports statistics continue to be presented as static tables of numbers, and game recaps as text articles. Content is generally limited to what is displayed on a single screen in static form, with limited or no tools or methods for manipulating data and media displayed to filter, query, or navigate to related information. Further still, due to small form factor of portable computing devices, often times content displayed on web pages, documents, applications, and/or forms cannot be displayed to a user in an intuitive and user-friendly way. What is needed are new systems and methods for interacting with content within the context of various types of computing devices in different environments (e.g., 2D, 3D, and mixed reality environments).

BRIEF DESCRIPTION OF THE DRAWINGS

FIGS. 4A, 4B, and 4C illustrate an example approach of adjusting a presentation of displayed content in accordance with various embodiments;

FIGS. 11A and 11B illustrate front and back views of an example device that can be used in accordance with various embodiments; and FIG. 12 illustrates an example configuration of components of a device such as that described with respect to FIG. 11.

DETAILED DESCRIPTION

Figure 1A:
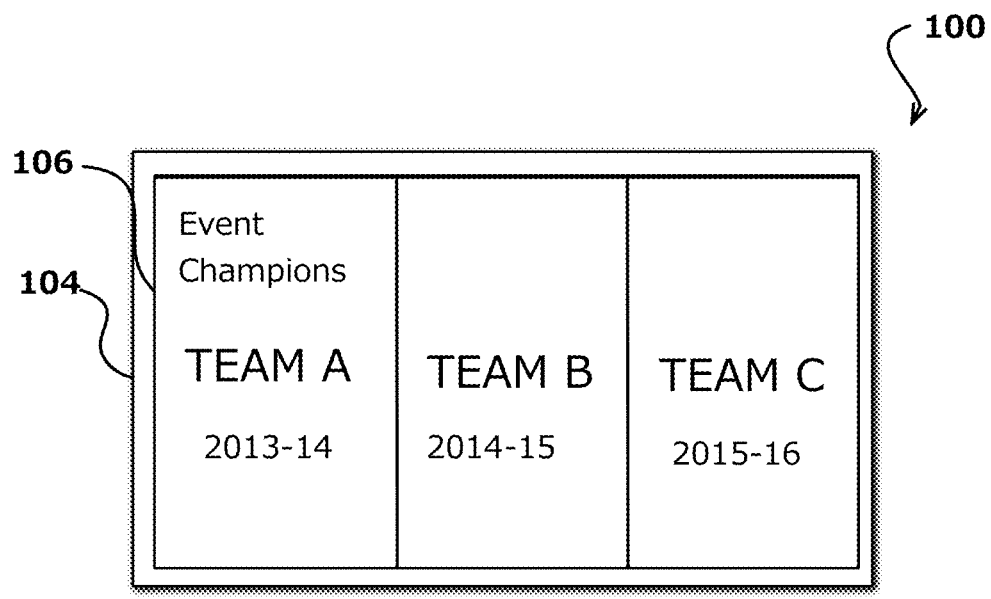
FIGS. 1A-1B illustrate environments in which a user is able to view content on different electronic devices in accordance with various embodiments.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs and in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Systems and methods in accordance with the embodiments described herein overcome various deficiencies in existing approaches to enabling a user to navigate digital content using an electronic device. In particular, various embodiments provide for navigating or otherwise interacting with content in response to input from a user, including voice inputs, device inputs, gesture inputs, among other such inputs such that a user can quickly and easily navigate to different levels of detail of content. This can include, for example, presenting content (e.g., images, multimedia, text, etc.) in a particular layout, and/or highlighting, emphasizing, animating, or otherwise altering in appearance, and/or arrangement the content or interface elements used to present the content based on a current level of desired detail, where the current level of detail can be determined by data selection criteria associated with a magnification level and other such data. As a user interacts with the computing device, for example, by providing a zoom input to change a magnification level, values of the selection criteria can be updated, which can be used to filter and/or select content for presentation.

For example, a magnification level can be associated with data selection criteria. The data selection criteria can be used for content selection (e.g., filtering, identifying, selecting, etc., of content) to provide a personalized view of the content. In certain situations, default selection criteria can be used to provide a default view of content. As will be described further herein, the level of detail can be associated with, for example, hierarchical and network relationships that can be used to govern interface navigation, access to content, and the like.

The data selection criteria and adjustments to values of the data selection criteria can be based on user input data, spatial input data, source data, among other types of data. Source data can include the type of content to be displayed. This can include sporting event content, gaming content, among other such content. Source data can include, for example, data from content networks, social media networks, news networks, gaming networks and/or games, and various other processors of content. The source data can be associated with a data structure such as directed data structure (e.g., acyclic graph), sequence data structure by scalar value, directed, acyclic graph with scalar time, undirected cyclic graph, among other such data structures. User input data can include a current magnification level or level of detail; a user profile (or default user profile) including user viewing behavior, user preferences such as viewing history, user favorites such as favorites sports, teams, players, etc.; device location information; device time zone information; user behavior models describing a user's viewing patterns, media consumption patterns, user input to change the magnification level, and the like; connected user behavior models based on social media data, etc. Spatial input data can include device characteristics such as screen size, screen orientation, display screen dimensions and/or shape, device hardware, etc.; view coordinate systems such as two- or three-dimensional coordinate systems; type of device such as desktop computer, TV, mobile device, smart glasses, smart contacts, etc.

An example of data selection criteria can include a range criteria and a scale criteria. The range criteria can include a first range value and a last range value. The first and last range value can be used to determine a range of values. The type of range values can include time values, price values, data size values, distance values, etc. Scale criteria can include one or more scale values. A scale value can represent an amount to adjust the range. For example, a scale value of one year will change the range of values by one year.

A change in a level of zoom can change the values of the data selection criteria. The amount by which the magnification level changes based on user input can depend on various factors, such as the size of the display screen which the content is displayed, the type of content, and other such factors. In certain embodiments, content can be associated with a default magnification level, such as a magnification level defined by a source of the content, an original content level, a fully zoomed out level, or full screen view. In this way, the presentation of content is changed based on a current zoom or magnification level, where different magnification levels can present different content in different layouts. For example, the magnification level can be used to determine values of the data selection criteria based on at least one mapping function. The values of the data selection criteria can be used to query a data base of content to identify or otherwise determine content for presentation. For example, portions of the content can be associated with a value, such as a time value. Data selection criteria optimized for time values can be used to select content associated with particular time for a particular layout for a current magnification level, and the selected content can be used generate a presentation of content.

Various inputs can be used to set or otherwise control the magnification level. For example, as a user tilts, rotates, or otherwise changes the orientation of the device, or performs a gesture (e.g., waves at the device) or touch input, the user can adjust the magnification level. As is understood to those in the art, spatial data such as the user's screen size can be used to determine an appropriate magnification level based on user inputs. As described further herein, adjusting the magnification level enables levels of detail to be seen. In an example, a user can control the magnification level by specifying, using an input element (e.g., two or more fingers), a boundary around the content, and then specify the magnification level by adjusting a separation of at least two of those fingers.

In various embodiments, changing the magnification level to control the presentation of content can be based on the relative position of the user to the device, which can be determined by capturing images using at least one camera of a computing device, and analyzing the images to determine the relative position of the user's head or eyes with respect to the device. Changes in the orientation and/or position of the computing device can also be determined using at least one motion sensor of the device, in order to provide for a higher sampling frequency than might otherwise be possible using the image information captured by the camera, or otherwise attempt to improve the relative position determinations. In some situations, a sensor remote, separate, or otherwise in communication with the device can be used to detect a change in orientation and/or position of the device. The orientation information can be received at the device from the sensor, and the device can cause the appearance of the interface to be altered based at least in part on the received orientation and/or position information. Accordingly, a user can view and interact with interface elements of the interface and can maneuver through the various interface elements using various approaches discussed and suggested herein.

In another example, a device can receive a voice command and an application executing on the device or otherwise in communication with the device can analyze audio input data of the voice command to determine how to carry out the command. The command can be used to, for example, control a magnification level of the content. As the user continues to change the magnification level, the presentation of content can be updated accordingly.

In certain embodiments, when the content and/or layout of the content is changed, various animation approaches can be utilized for the transition of content. For example, approaches described herein allow for an animated departure, appearance, and/or arrangement of content as a user controls the magnification level. Accordingly, content can be shown as rotating, turning, or being animated in a number of different ways and at different speeds as contents exits the display screen. The animation can further show an animated appearance of content. Such animation can advantageously be used to mask latency while loading pages and can be used to modify or otherwise enhance the appearance of a page. It should be noted that various other animations are possible in accordance with embodiments described herein.

Various embodiments provide for ingesting, processing, and analyzing event-based telemetry for use as content. In one embodiment, an event, for example, for a sporting event, e-sporting event, video game, etc. may be determined during the event and received at an event queue that may be located in a multi-tenant resource provider environment, for example a cloud service provider such as Amazon Web Services or Google Cloud. While the term "queue" is used herein, those of skill in the art will understand that the techniques described herein are not limited to a particular type of queue or data structure and may be implemented in various ways, such as a "buffer" or a process (e.g., a "Event Transaction Service") executing at or in communication with the resource provider environment that is configured to perform various functionality, such as storing events and capable of maintaining various contexts for the stored and/or received events, such as temporal data about the event(s) and whether the events have been received (e.g., pulled by an event pipeline or other component or pushed to another component by the queue). The event may have been generated by an "event producer," such as an application or other process, such as a client/server system, that may be operating independently of, or in whole or in part at, the resource provider environment. The events may contain various data, such as described further herein, including for example a type of event and timestamp data that may be capable of indicating a particular frame of visual content with which the event is associated. The event can be associated with content, such as still images, video, text, etc. Upon receipt, the event queue, or other component operating in communication with the event queue, may determine one or more "event pipelines" or "pipelines" that will process the event, although in an embodiment, all events are passed from the event queue to all of the event pipelines. In one embodiment, an "event pipeline" or "pipeline" as described herein may comprise any number of technologies that allow for, control, or assist with data processing, transmission, storage, and/or retrieval, for example, among other functions.

In an embodiment, the events can be aggregated using respective timestamp data to compile insight information with respect to the event. One or more algorithms or other such approaches such as a trained neural network can be used to determine correlations between the events and interface elements for presenting content. The correlations or usage patterns between the events and interface elements can be used to present content as a user controls the magnification level among other such inputs.

In various embodiments, query functions can be associated with content types, where a query function (also referred to as "function") can be used to select, identify, or otherwise determine content of a particular content type based on a value (also referred to as "property value") associated with the content. Example values include time, location, size, etc. In an embodiment, associating a query function to a content type can be based on mapping information, for example, a lookup table, rules, or other information that relate a function with a content type.

In response to receiving a magnification level, the magnification level can be used to determine a plurality of paths through a hierarchical tree of functions used to filter or otherwise select content. The plurality of paths can correspond to content to be displayed for a particular level of detail for an interface and determined based at least in part by traversing the hierarchical tree from a highest level until reaching the appropriate node. For example, the magnification level can be received for a first level of detail. The magnification level can be mapped or otherwise converted to a value, such a time value, location value, size value, etc. based at least in part on the context of an application and other appropriate conversion technique. Based on the property value determined from the magnification level, a first query function can be applied to determine a portion of content of a second content type. Content portions of the second content type can be associated with a second function, and the value can be used by the second function to determine content for a third content type. The process can continue until the property value does not return content for a particular function. Thereafter, a presentation of content can be generated that includes the determined content.

Accordingly, approaches in accordance with various embodiments improve the operation and performance of the computing device(s) on which they are implemented and with which they communicate wirelessly by, among other advantages, providing content based on user interaction, computing resources (e.g., screen size), etc. Such a system can improve an online viewing experience for various events such as live sporting events, electronic gaming events, etc., for example, in that it dynamically provides layers of content of interest to a user. Approaches presented herein can work with various types of content, including still images, video, real time data, among other such data. Further, such approaches allow for displaying content in response to a user action, resulting in content responsive to a user input, which a user will be more likely to view, in order to improve the user experience and help the user more quickly locate content of interest. In addition to improving the user experience, showing content that is more likely to result in views and opportunities to present related content such as advertisements or other offers which can improve the revenue for the provider of the content, or other such party or entity.

In various embodiments, analyzing event-based telemetry and/or other such information and organizing and presenting content using interrelated data visualizations, timelines, and narrative content based on a selected level of detail of the content can occur over a connected network, which can utilize a number of different computing devices. The network can be provided and/or utilized in any appropriate electronic environment, such as a data center offering in a shared resource or other multi-tenant environment, as well as any non-virtualized or otherwise private data center. Although various embodiments described herein are discussed in regard to a particular network, it should be understood that embodiments described herein for enabling a user to navigate digital content can apply to any network.

Various other applications, processes, and uses are described below with respect to various embodiments, each of which improves the operation and performance of the computing device) on which they are implemented, for example, by providing related and/or relevant content presented in an organized, economic fashion.

Figure 1B:
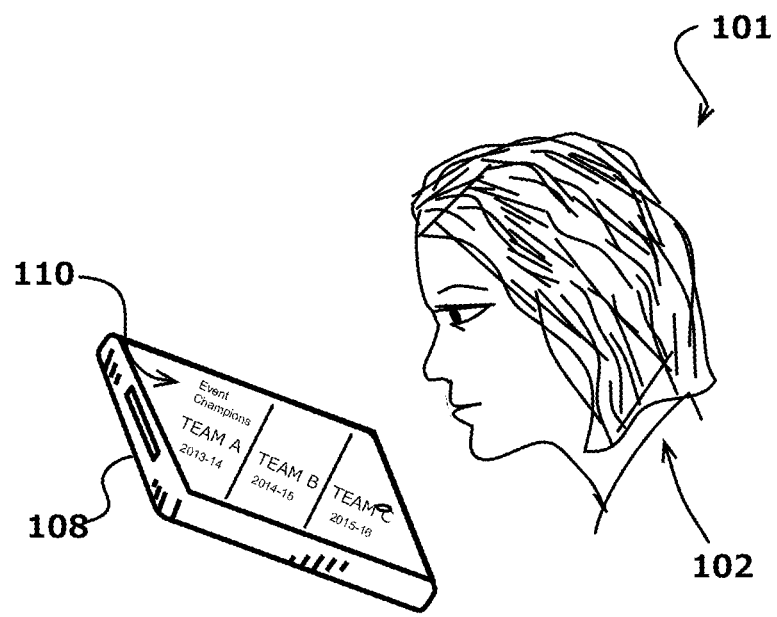

FIGS. 1A and 1B illustrates an example situation in which a user 102 is able to view the same content on different devices (e.g., device 104 and device 108). As shown in example 100 of FIG. 1A, the user is viewing a first version 106 of content on a large format device, in this case a flat screen television 104. Due at least in part to the size and resolution of the television, the user 102 is able to view the content at a relatively high resolution, such as 4K or 8K, and is still able to discern small details in the content. However, the content is relatively static, and navigation and interaction is limited to conventional approaches. In example 101 of FIG. 1B, the user 102 is also able to view a second version 110 of the same (or similar) content on another device, such as a portable computing device 108. Although a portable computing device (e.g., a smart phone, an e-book reader, or tablet computer) is shown, it should be understood that various other types of electronic devices which are capable of displaying video content can be used in accordance with various embodiments discussed herein. These devices can include, for example, desktop computers, notebook computers, personal data assistants, video gaming consoles or controllers, wearable computers (e.g., a smart watch or glasses), and portable media players, smart phones, among others. The portable computing device 108 has a display screen that is much smaller (e.g., 8.9" or smaller screen), and potentially much lower in resolution, than the television 104 (FIG. 1A).

The difference in screen size can result in the user being unable to view a satisfactory level of detail in the content displayed via the portable computing device 108. Even if the user is able to play the same, high resolution version on both devices, the size of the display on the portable computing device can prevent the user from obtaining (e.g., viewing) the desired level of detail. As described, in order to help users to navigate applications and perform these tasks in more intuitive and user-friendly ways, interfaces are increasingly providing new mobile-optimized views and types of interactivity. These approaches include navigation techniques such as animating screens of content on an imaginary two-dimensional (2D) plane perpendicular to the device, so that the user can utilize various swipe gestures to move between screens. While such approaches can enhance a user's experience in interacting with such content, in many situations the content is identical to content as presented through previous technology. For example, as shown in FIG. 1A and FIG. 1B, sports statistics continue to be presented as static tables of numbers, and game recaps as text articles such that content of interest to the user is limited to what is displayed and interaction may be limited to navigating from one relatively static presentation of content to another relatively static presentation of content. Further, in many situations the content is not organized or presented in an intuitive way. For example, it can be difficult for a user to locate desired content due to the manner in which it is presented on the display screen of the computing device. Some presentations of content do provide for different levels of detail based on a zoom input. However, these applications are typically limited to a particular type of content, such as mapping data for a mapping application. Further, while such approaches may provide different levels of detail for a particular type of content, such approaches do not present content (e.g., images, multimedia, text, etc.) in a particular layout, and/or highlighting, emphasizing, animating, or otherwise altering in appearance, and/or arrangement of the interface elements used to present the content based on a current zoom or magnification level, where the current zoom level is associated with a level of detail determined by respective selection criteria.

Accordingly, in accordance with various embodiments described herein, approaches provide for presenting data, media, and time using spatial levels of detail in two- and three-dimensional digital applications.

Figure 2A:
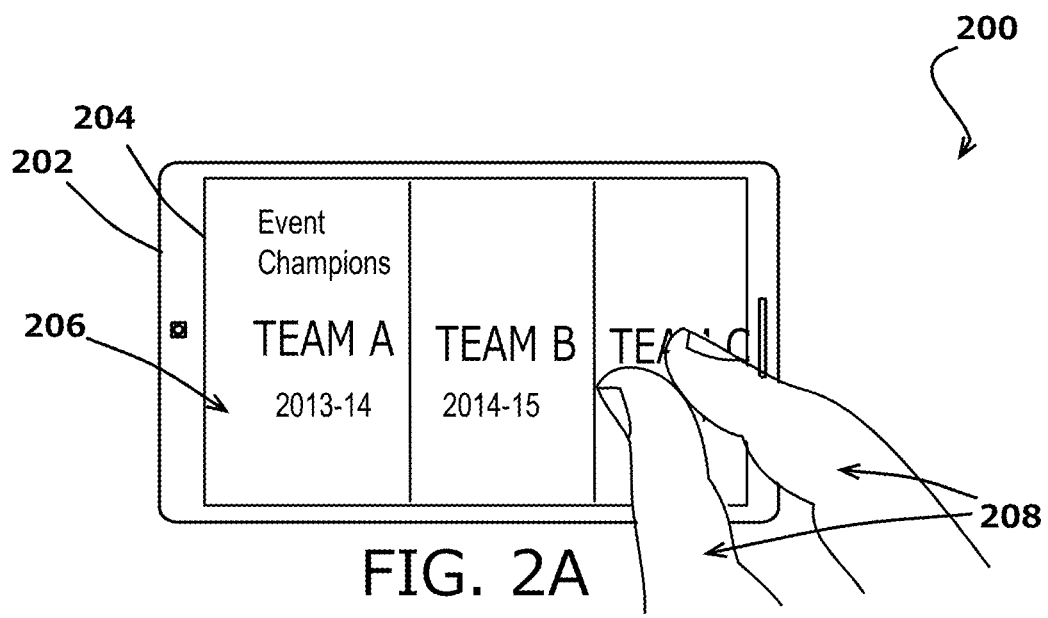
FIGS. 2A and 2B illustrate an example approach enabling a user to control a presentation of content in accordance with various embodiments.

For example, approaches in accordance with various embodiments can enable a user to adjust a magnification level of a presentation of content in order to obtain, for selected content, a level of detail or view that is acceptable to the user. As an example, FIG. 2A illustrates an example situation 200 wherein a user is able to view a presentation of content 206 on a touch-sensitive display 204 of a computing device 202. This example and the examples that follow include information for sports games, players and season schedules related to basketball and made available through various methods, including an interactive timeline with temporal levels of detail and various interactive data visualizations. It should be noted, however, that although examples are described with respect to basketball games, approaches described herein are not limited to such games and other sporting events, gaming events, and the like are contemplated within the teachings herein.

FIG. 2A represents example 200 of a root level of a primary timeline area of an application that provides access to sports seasons arranged in chronological order from left to right. This can correspond to content being displayed with a default magnification. It should be noted that this is one representation of an era-scale temporal level of detail, showing only year and season champion. The timeline can be manipulated and navigated using various gestures to show more years at once, view different year ranges, and zoom into any season to access the next temporal level of detail. As described, the particular content (e.g., images, multimedia, text, etc.) presented and layout of the content can be based on a current level of detail, where the current level of detail can be determined by selection criteria associated with a zoom or magnification level.

For example, it is possible that the user will want to "zoom in" or otherwise increase a magnification level of the content. As will be described further herein, a magnification level can be associated with data selection criteria and the data selection criteria can be used for content selection (e.g., filtering, identifying, etc.) to provide a personalized view of the content. In some embodiments, a user might be able to select a slider bar or other interface element in order to adjust the magnification. In this example, the user is able to place their fingers 208 proximate to each other on, or sufficiently near to, a surface of the touch-sensitive display to specify a boundary around an object. For example, if the user places two fingers on the touch-sensitive display, the operating system of the device may identify the two contact points on the touch-sensitive display as opposing corners of a bounding area (e.g., rectangle, square, octagon) and generate other corners as specified distances from the contact points, thereby establishing a boundary area based on the inputs provided by the user. In another implementation, the inputs from the user's two fingers may be used to identify a center point, such as a point equidistant from the two inputs, as the center point around which any specified magnification is to be performed. Approaches for providing touch input to a touch-sensitive display, such as through capacitive input, are well known in the art and as such will not be discussed in detail herein.

Figure 2B:
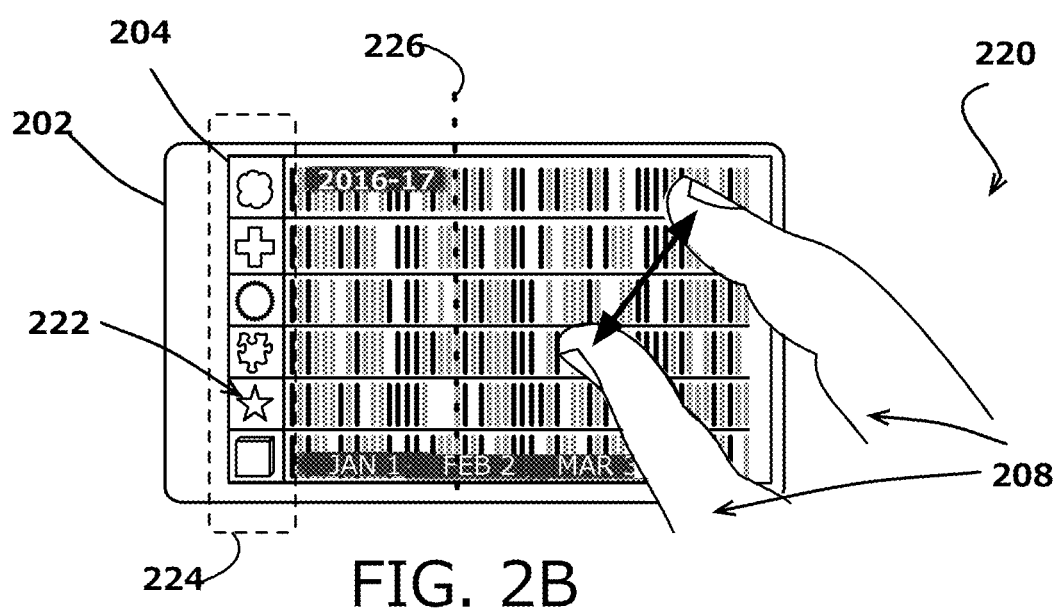

As illustrated in the example situation 220 of FIG. 2B, the user can then separate their fingers 208 along the touch-sensitive display in order to adjust a magnification level of the content displayed. In at least some embodiments, a user can "pinch" their fingers together to decrease a magnification level and separate their fingers to increase a magnification level, although other options can be utilized as well. The amount of magnification change can depend upon the amount of change in separation of the fingers. The rate at which magnification level changes with finger separation can be configurable, in at least some embodiments, similar to ways in which a user can adjust the effective "speed" of a mouse or other input device. The ability to adjust the magnification level enables the user to present different content in different layouts. For example, FIG. 2A can represent content presented for a first level of detail. As shown, the content is arranged in chronological order from left to right showing only high-level descriptions of event champions for a sporting event. FIG. 2B can represent content present at a different level of detail, for example, a second level of detail. As shown, content 222 can include a full season timeline of a sports league season schedule and various other data points. In this example, the season timeline can be a dynamic data visualization of a sports league season such as a basketball league. The season timeline can include one or more data points. In accordance with various embodiments, this can include grouping league conferences separately, rendering a team's schedule as a row, sorting a conference by a team's current conference ranking as determined by their win-loss record or time range the user has selected, among other such layouts. As will be described further herein, data selection criteria can be used for content selection (e.g., filtering, identifying, etc.) to provide a personalized view of the content, where the data selection criteria and adjustments to values of the data selection criteria can be based on the magnification level, the type of content to be displayed, one or more machined-learned models, a user profile, device characteristics, etc.

As shown in this example, icons 224 can represent sport teams. Dotted line 226 can represent the current day. Black and grey lines can represent wins and loses respectively. Other data points can include a timeline, indication of future games, a team's win-loss record displayed numerically and/or a graphical representation such as a bar chart. In an embodiment, the content responsible for the display of temporal labels, such as years, months, and dates can dynamically update to temporal magnification level and can include the appropriate increment labels. In accordance with various embodiments, such approaches to representing data can provide for a more efficient visual comprehension of, for example, team win-loss records, game schedule, etc.

As the user continues to adjust the magnification level, the content and layout of the content can be updated. For example, tapping or pinching can cause the primary layout grid and coordinated timeline control to adjust their scales from showing the entire season to showing a zoomed in segment of the season. In this situation, the on-screen elements can adapt to provide additional detail. For example, opponent logos may become visible, among other such visual representations. Further, the timeline labeling can dynamically adjusts to show dates, and the date information can be displayed in various other areas of the display screen. In accordance with various embodiments, the content displayed and/or layout of the content is not limited to any particular situation, can be updated in a number of different ways. Continuing with this example, tapping or pinching again can present another level of detail, where, for example, game scores and future game times are shown.

Figure 3A:
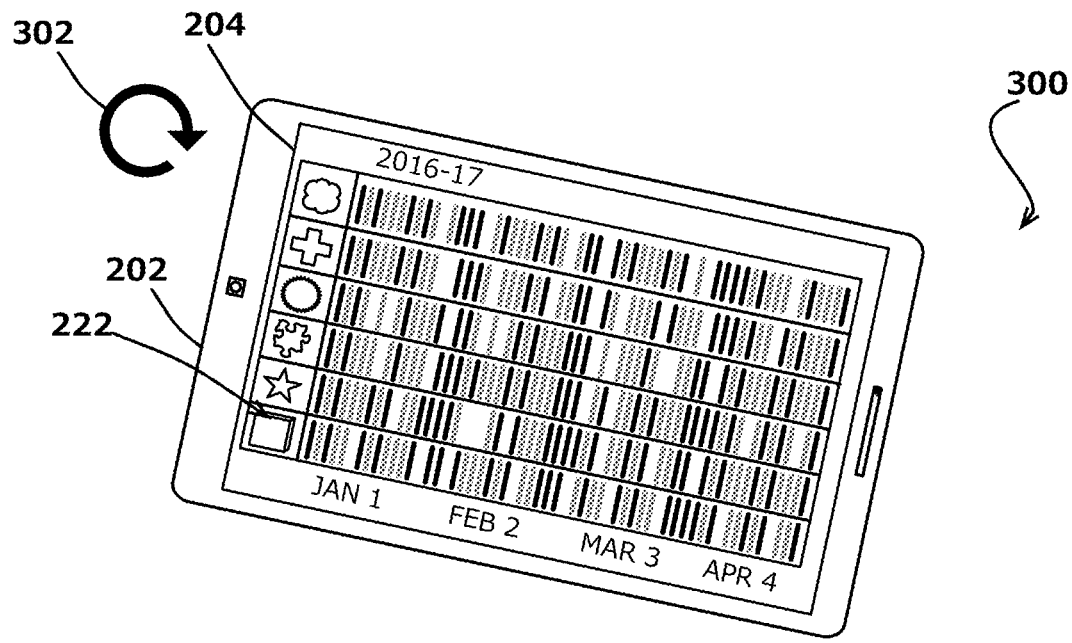
FIGS. 3A and 3B illustrate an example approach enabling a user to control a presentation of displayed content in accordance with an alternative embodiment.
Figure 3B:
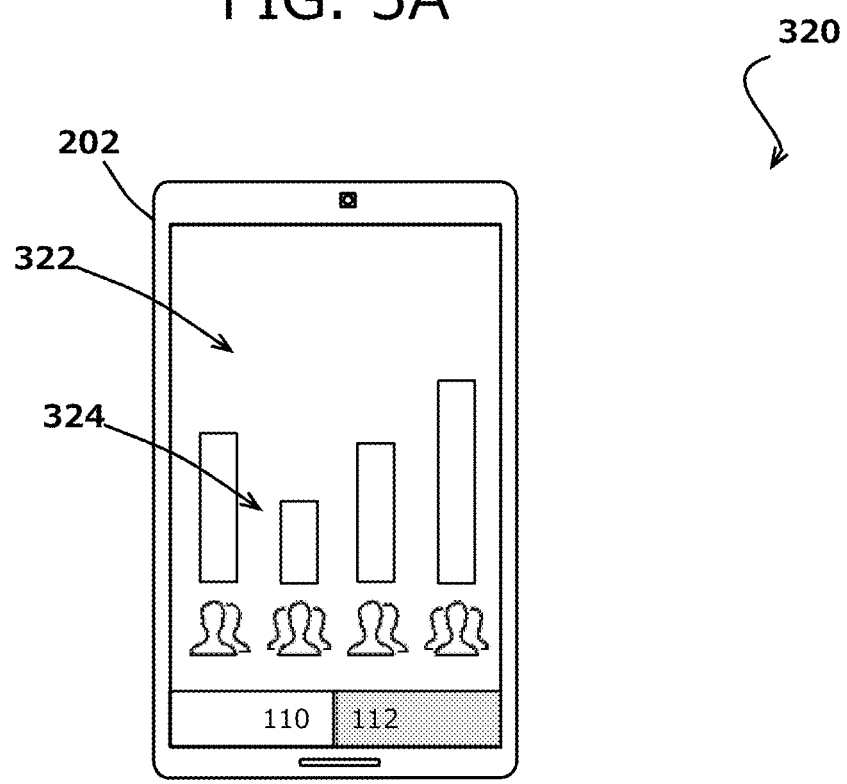

As described, the current level of detail can be determined based on data selection criteria, where data selection criteria and adjustments to values of the data selection criteria can be based on the magnification level, the type of content to be displayed, a user profile, device characteristics, user input data, spatial input data, source data, among other types of data. In this example, a level of detail is determined by the orientation of the device. For example, example 300 of FIG. 3A illustrates a full season timeline of a sports league season schedule and various other data points as illustrated in FIG. 2B. It should be understood that reference numbers for similar elements may be carried over between figures for purposes of explanation, but that such usage should not be interpreted as a limitation on the various embodiments. In this example, the user has rotated device 202 clockwise 302, so that device 202 is in a vertical position as illustrated in example 320 of FIG. 3B. Based on the user input of rotating the device, the content and layout of the content can be updated as illustrated in interface 322. As shown, interface 322 displays cumulative game statistics for teams and/or players. In various embodiments, when oriented horizontally, game statistics and events can be presented in a variety of time segments. Accordingly, changing the orientation of the device while viewing an individual game can shift between one or more layouts. In various embodiments, a variety of data visualization techniques can be used to depict, for example, the "most important" game statistics. The most important game statistics can be based on a user model or other such recommendation approach used to recommend content. The statistics can include, for example, points, breakdown of points by type, the two types of rebounds, assists, blocks, steals, turnovers, and fouls. As described, the data displayed, the layout of data, the color of the data, etc., can be based on user input, spatial input, etc. For example, team statistics can be presented side-by-side 324 to enable efficient visual comparison. Each statistic can be represented by a distinct icon. In some situations, the icons can be used consistently throughout a particular application. A unique color scheme can enable efficient visual differentiation of different kinds of activity. For example, offensive activity can be associated with a warm color scheme, where points can be depicted in shades of orange, and offensive rebounds and assists can be depicted in yellow. In another example, defensive activity can be blue, and can be used for defensive rebounds, block, and steals. In yet another example, turnover and fouls can be represented in red. Information blocks included in a layout can show win-loss status for each team, score, and game date, for example.

In accordance with various embodiments, during live games, the system can obtain new game data at a predetermined intervals of time, for example, every three seconds. When new game data is received, the various visualizations and timelines, or a subset of the visualization and times, can update in real-time based on the new data. A "live" indicator can show the active status of the game, as well as the current game quarter and time remaining.

Various user inputs can be used to display additional content. For example, when at a particular magnification level, swiping left or right within an area of an interface can navigate to the next or previous game in a team's schedule. In another example, tapping an area of the interface can reveal new content and/or content in a new layout. For example, tapping an area can display team shooting percentages for each point type displayed both graphically and numerically. Tapping again can reveal the next level of detail, for example, player shooting comparison. At this level, individual player's shooting performance can be visualized with a color-coded bar chart and coordinated display of field goal percentage. Players can be dynamically ordered so that the highest scoring players for each team align to the center of the chart area. This advantageously makes it possible to efficiently compare players within a team and across teams. A number of point type icons can be displayed. These icons can provide interactive controls with on and off states. In an embodiment, all points types are on by default, resulting in the chart showing all point types. In this example, tapping particular icons, such as a 1 and a 2 icon can remove those point types from the chart, enabling the user to more easily compare three-point shooting totals and percentages. In response to tapping the icons, other displayed data may be updated. For example, data displayed corresponding to percentage one or more of 1, 2, and 3 points made can be dynamically updated. It should be noted that examples described herein can be applied to other statistics in basketball such as rebounds and assist or other such sport or gaming events. In another example, at a particular level of detail, tapping an interface element representing a team can reveal the players who appeared in the game. Individual players can be selected to show their individual statistics for the game. Various data points such as points scored can be updated based on the selected player. Selecting such data points can reveal additional data, such as shooting percentages per point type.

Figure 4B:
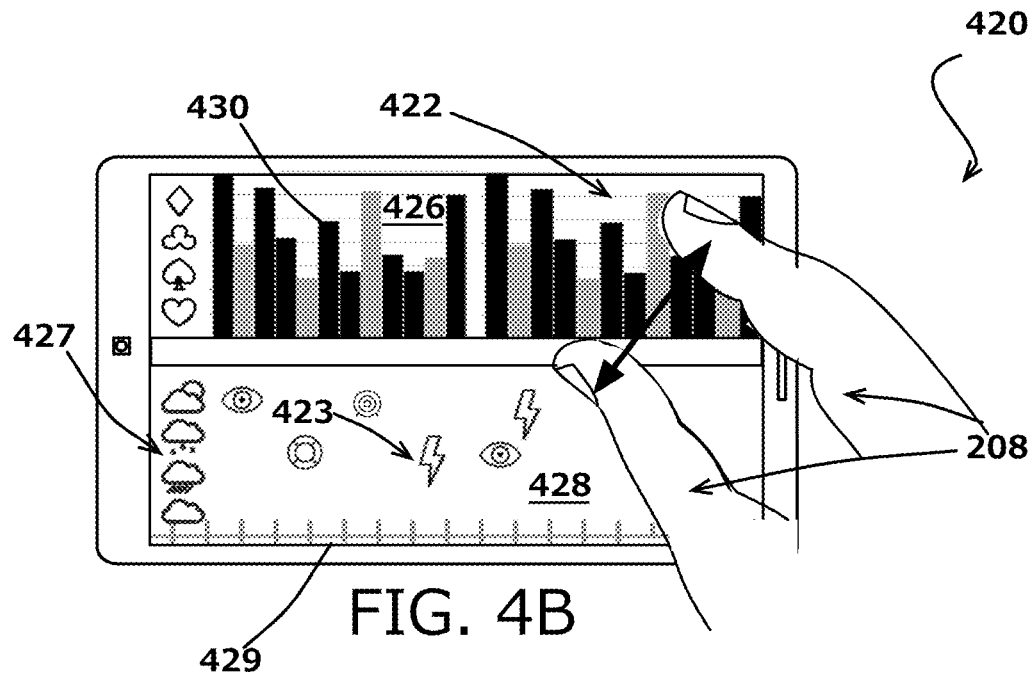
Figure 4C:
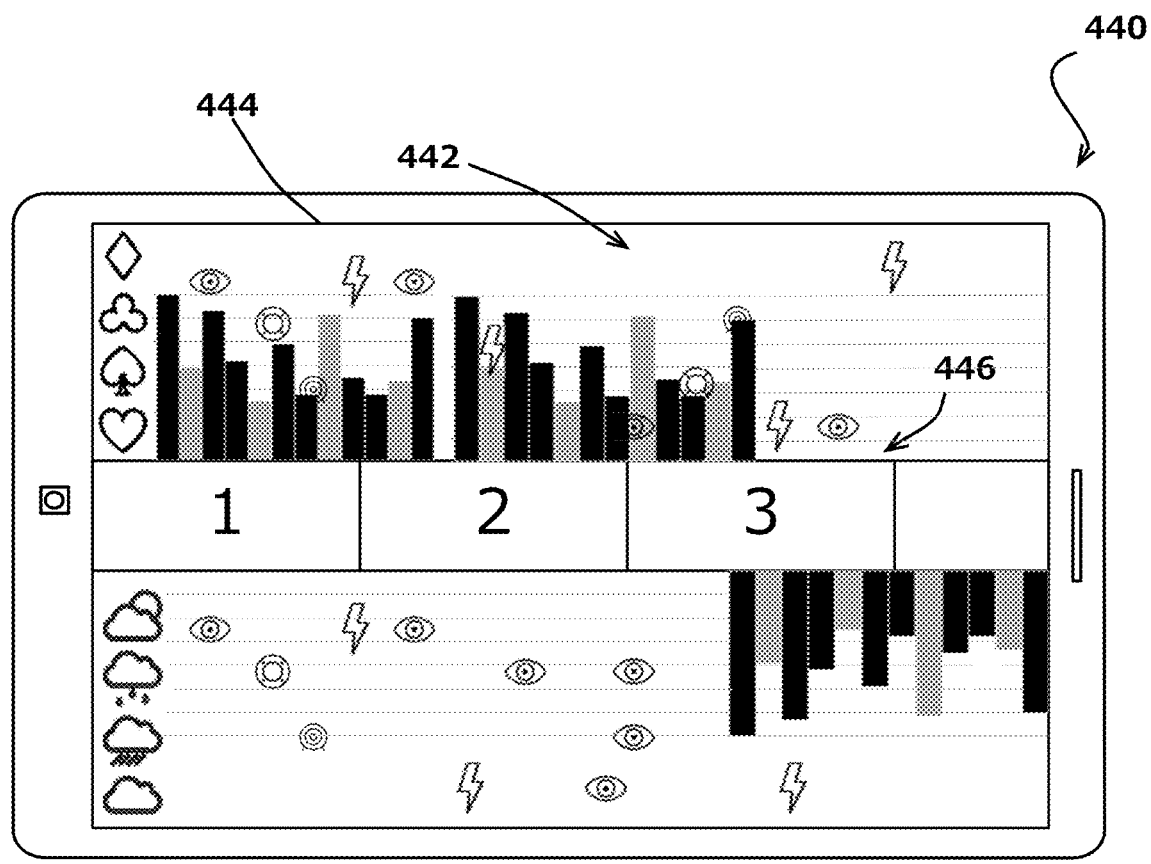

FIGS. 4A, 4B, and 4C illustrates how the level of detail can be based on magnification level and device characteristics in accordance with various embodiments. In this example, situation 400 of FIG. 4A includes interface 402. Interface 402 is a representation of a game at a particular magnification level when the device is a horizontal orientation. As shown, interface 402 game stats and events are organized by various user-selectable time intervals and levels of detail. In a default view, points can be displayed by each team in each quarter of the game, with additional data showing the overall field goal percentage. In an embodiment, tapping any of the team icons 404 can filter the view to emphasize the selected team, making it easier to understand the team's per-quarter performance, while still being able to compare with the opposing team's performance. Using pinch and tap gestures, a user may zoom into segments of the same, such as the first or second half of the game, and then into a single quarter. Additional detail can be revealed, showing point type totals and shooting percentages. For example, a user can "zoom in" to display additional content. In another example, a user can swipe 406 to display additional content. For example, the user can swipe up on the interface.

Example situation 420 of FIG. 4B illustrates interface 422. In this example, interface 422 includes an interactive visualization of one or more game events 423. The game events can be generated from data used to determine game statistics. In accordance with various embodiments, interface 422 can enable a user to visually read the flow of a particular game. Interface 422 can be an interactive timeline, for example, enabling navigation to different game intervals and levels of detail by utilizing one or more inputs, such as tap and pinch gestures. Interface 422 can be divided into halves (e.g., a top half 426 and a bottom half 428), with each half showing information for a particular team. Individual players 427 can be positioned on a row and timestamped game events related to players can be displayed on a respective row at an appropriate time. In certain embodiments, the score at the end of each quarter for each team can be displayed. For example, the score can be displayed at the top and bottom, aligned with the end of the that quarter on the timeline 429. Graph 430 can visualize a point differential, showing how the lead shifts over the course of the game in response to each scoring event. The graph scale can be determined dynamically by the maximum lead within the game. As a user adjusts the magnification level, the content and layout of the content can be updated. For example, as a user adjusts the magnification level, the visual elements on timeline 429 can adapt based on the selected intervals, animating into new positions, changing opacity, and the like. Swiping over an edge of the screen can reveal a coordinated numeric stats panel. In this example, numbers can be displayed for each stat in the panel for each player and can reflect the totals as of the game time that aligns with the edge of the timeline display area. In another example, the numbers can reflect the totals for the area of the timeline displayed on screen. The user may swipe left or right on the timeline area to view other game intervals. As the user scrolls, the numbers shown in the stats panel and each team's score can change dynamically based on the totals as of the end of the selected interval.

As described, the current level of detail can be determined based on data selection criteria, where the data selection criteria and adjustments to values of the data selection criteria can be based on the device characteristics. In this example, a level of detail can be determined by screen size. For example, situation 440 of FIG. 4C illustrates interface 442 for screen 444. As shown, interface 442 includes an area 446 for video content. In this example, video content can be synchronized with the game timeline and other visualizations. In an embodiment, tapping or otherwise selecting an area of the video content can put the game timeline into auto-play highlight mode.

Figure 5A:
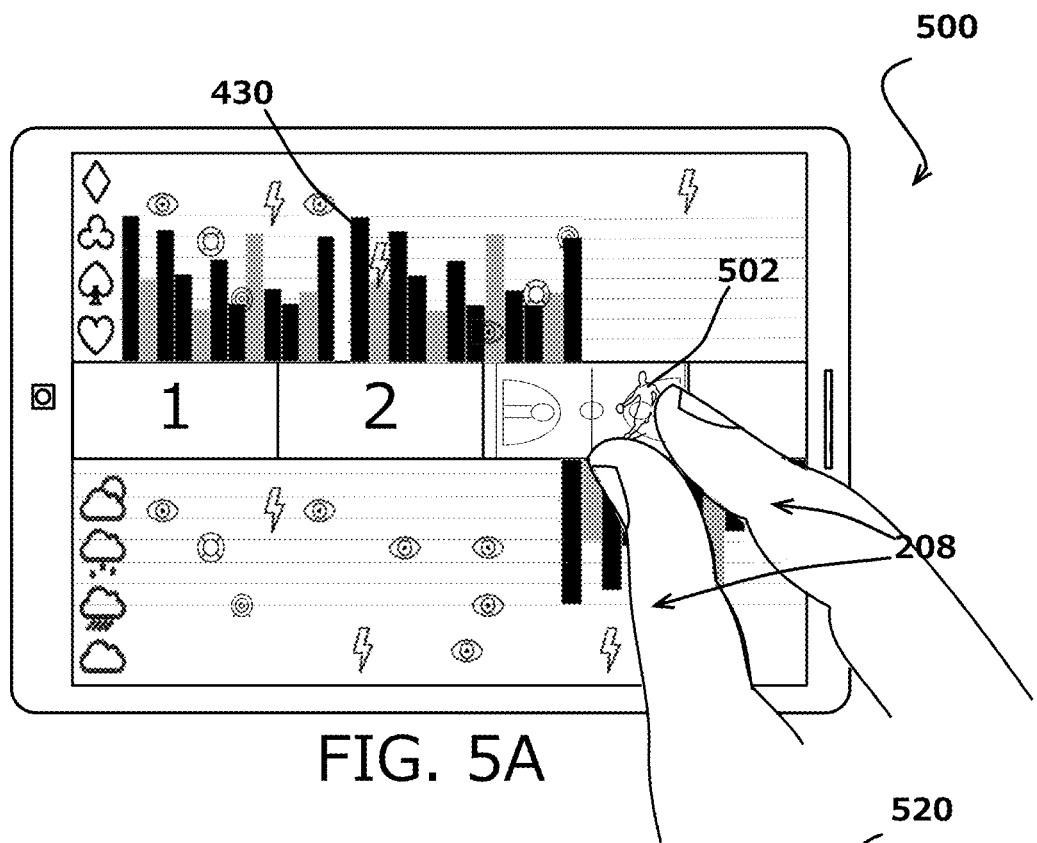
FIGS. 5A and 5B illustrate an example approach enabling a user to select an object in the displayed content, as well as a relative magnification for the object, in accordance with various embodiments.

For example, FIG. 5A illustrates an example situation 500 wherein the user wants to not only adjust the magnification level, but also wants to select a specific object represented in the video. In this example, the user is interested in obtaining a magnified view of a player represented in the video content. Further, the user is interested in having the magnified view "follow" the player when the player is on the screen, such that the player remains approximately centered in the displayed video frames and at the specified magnification level, at least when the player is on the screen.

In this example, a user can place the tips of their fingers together (or at least proximate one another) on or near the touch-sensitive display. The fingertips can be placed near the edges of the representation of the player 502 in the frame. By indicating the edges of the representation of the player (or other portion(s) of the player in other embodiments) the user can indicate or "tag" the player to be selected as an object of interest. In some embodiments, the user might have to hold their fingers in place for a minimum amount of time, such as at least one second, in order to indicate that an object of interest is being specified. In other embodiments, a user might use three fingers to indicate the selection and magnification setting, where the middle finger can indicate the object and the other fingers can be spread to indicate the desired magnification level. Rather than using their fingers to cause the input, in some embodiments, the user may use a stylus, audible input, head tracking, gaze tracking, gestures, etc.

For example, rather than using a touch-based input, a user may provide an audible input to select an object of interest. As an illustration, a user may say "Select player X" to cause selection of the player as the object of interest. As another example, one or more image capture devices on the mobile device may determine the user's gaze or areas on the display at which the user is looking. If the user focuses on a particular area of the display, or an object within the video content, for a determined amount of time, the object or area where the user is looking may be selected as the object of interest. In such an example, the user may be asked whether they want to magnify the object of interest and track the movement of the object of interest. In another example, the user may have established preferences to automatically magnify and track an object upon detecting that the user's gaze has been focused on the object for a determined period of time. In still another example, one or more image capture devices on the mobile device may detect a gesture of the user. For example, rather than touching the display, a user may point at an object in the video content. The image(s) of the captured gesture may be processed to determine the position of the gesture with respect to the video content and determine a corresponding object of interest.

In some embodiments, upon selection of an object of interest, an indication, such as a visual, audio, and/or haptic indication, will be provided in order to indicate to the user that the object of interest has been determined. In some embodiments, a graphical representation will indicate the object that the device or software has selected, so that the user can make a different selection if the determination is incorrect. An object of interest may be any object or region within a video that a user desires to track. For example, the object of interest may be an object that moves in the video with respect to other objects, such as representations of other humans, etc. Likewise, the object of interest may be a stationary object or region that moves within the video as a result of the field of view of the video changing.

Once the correct object of interest is determined, in at least some embodiments, the user can make a motion or provide an input to indicate a magnification level and/or presentation size to be used for the object of interest. In a touch-based input example, the user can spread their fingers apart, which can cause the magnification level of the object of interest to adjust, similar to the pinch-to-zoom feature known today. Likewise, if the user moves their fingers together, it may cause the object of interest to decrease in size. As discussed previously, the user can adjust the separation of the fingertips on, or near, the touch-sensitive display in order to adjust the magnification level of the video, such as where the magnification level increases with an increase in separation between the fingertips and decreases with a decrease in separation. Other motions or inputs can be provided as well. For example, one or more cameras may be used to detect a gesture performed by the user to select an object of interest and/or specify a magnification level. In some embodiments, a user can also provide audio commands. Continuing with the audio-based selection of the player, the user may provide an audible command, such as, "Increase magnification level to three" to increase the magnification level of the player and/or the area of the video content that includes the player. An audible command may be any command to alter or otherwise change or adjust the magnification level of the object of interest. For example, an audible command may be an increase command (such as the one illustrated above), decrease command (e.g., "Decrease magnification level by two."), and/or other adjustment commands (e.g., "Original size," "increase five x," "zoom in," "zoom out."). In some examples, different input types may be combined. For example, the user may select an object using gaze tracking and then provide an audible command to adjust the magnification of the selected object of interest.

Figure 5B:
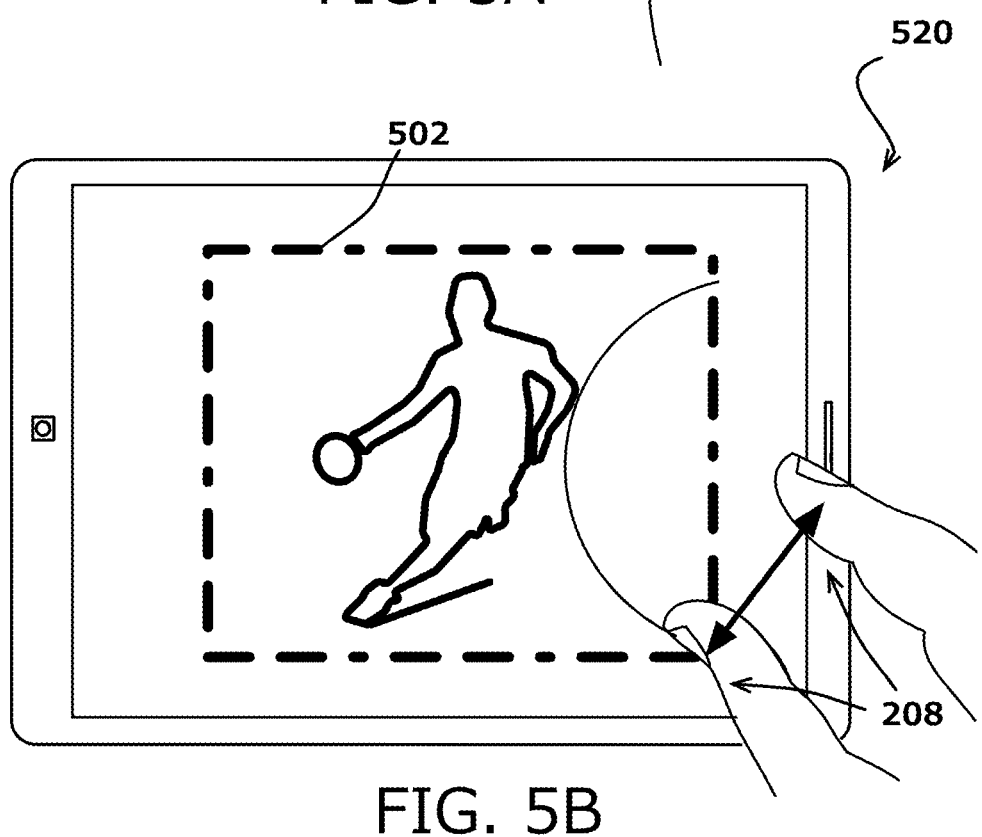

In the example situation 520 of FIG. 5B it is illustrated that, in addition to adjusting the magnification level and zooming into the frame of video, the portion 502 of the frame that is displayed can be substantially centered on the object of interest, in this case the representation of the player. In some instances where the representation of the object of interest is near the edge of the frame it may not be possible to center the object in the displayed view, but the process can attempt to center the object of interest to the extent possible.

In at least some embodiments, an active tracking process can be used for an object of interest, such as a sport player. In one embodiment, a user selecting two points on the display can cause that frame of video to be analyzed using at least one object recognition process, such as an object identification process or computer vision process, among others, to attempt to identify a representation of an object that has edges or other features proximate to the selected points. In some embodiments, the process can take a portion of the frame of video corresponding to the points and utilize an image matching process to attempt to match the portion against a library of images in order to identify the object of interest. In other embodiments, the process instead attempts to determine identifying features that enable the object to be tracked between frames. For each frame, the process can attempt to locate the object of interest, in many cases using the previous position as a starting point. Accordingly, video playback can allow for coordination with the surrounding data context. For example, game timeline 430 can animate in real-time, coordinated with the video playback. As events happen in the video footage (e.g., a player made a 3-point shot), the events can become highlighted in the player's row or otherwise on the layout. In an embodiments, players involved in the video or otherwise selected can have their row animated to show the appropriate data context.

Figure 6:
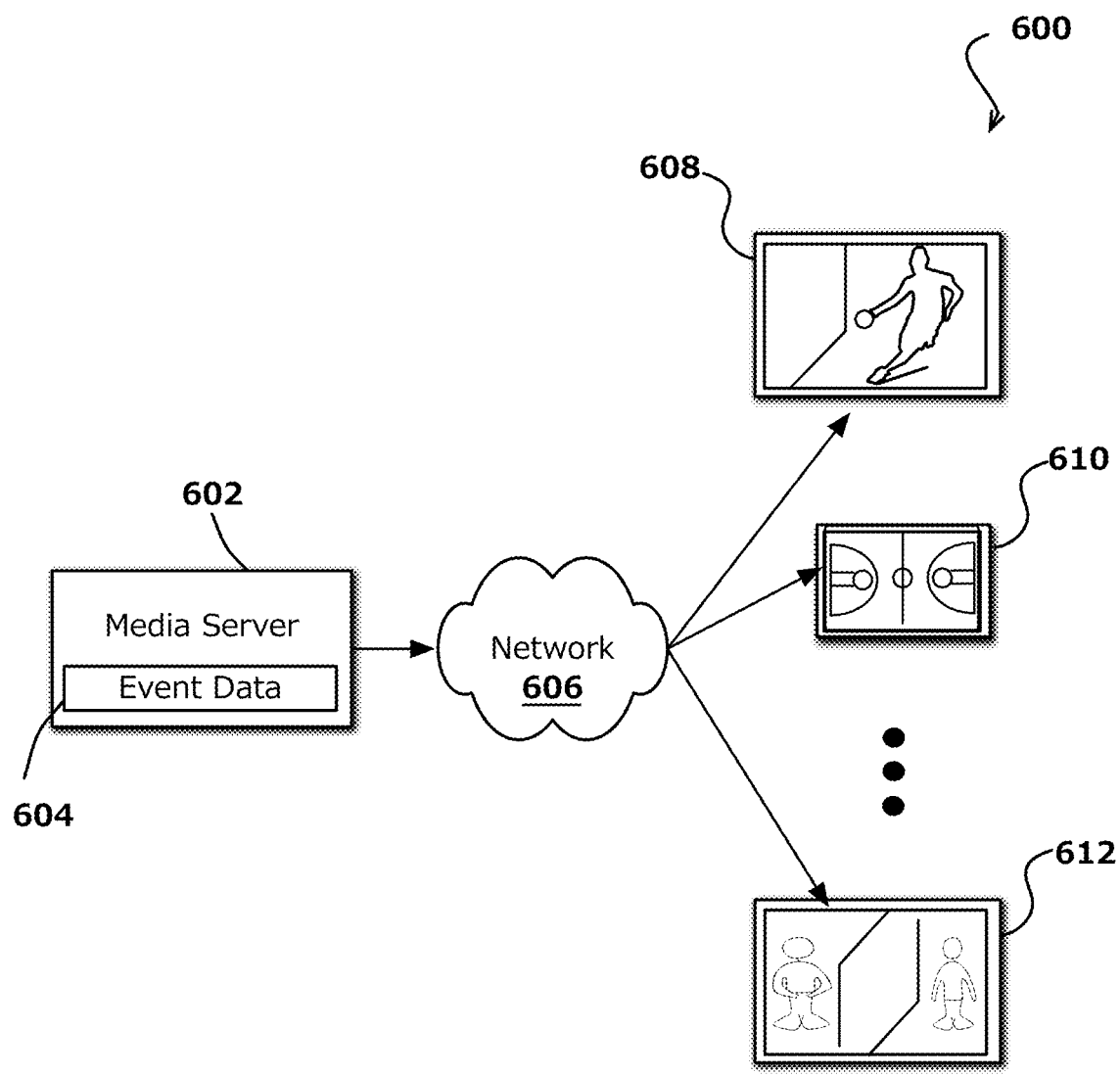
FIG. 6 illustrates an example media environment that can be utilized to provide media content in accordance with various embodiments.

Accordingly, approaches in accordance with various embodiments can attempt to provide improved content interaction systems that can be utilized for various types of events as may include sporting events, gaming events, marketing events, live show events, live sporting events, concerts, marketing events, financing transactions, among other such events and environments. FIG. 6 illustrates an example system implementation 600 that can be utilized to determine event data that allows a user to view various levels of detail of content as a user navigates the content using an electronic device. For a media viewing application, there can be one or more media servers 602 (e.g., network television servers, game servers, etc.) that can execute the media executing on various user devices 608, 610, 612. These devices can include specific devices, such as smart phones, tablet computers, wearable computers (e.g., smart glasses or watches), desktop or notebook computers or other computing devices such as, and the like. In the situation of sporting and/or gaming events or other such situations described herein, the devices can communicate with the media server 602 over at least one network, such as the Internet, a cellular network, a dedicated media network, or a peer-to-peer network, among other such options, such that the media server 602 can track event data 604 such as fine-grained player behavior in the sporting activity and/or in-game for each player in a particular playing session. The fine-grained player behavior can be transmitted to the media server 602 at appropriate times, such as periodically, in response to certain actions or occurrences in the playing session, in response to requests from the server, or at other appropriate times. The fine-grained player behavior or telemetry "events" includes metadata that identifies a particular player or entity who performed an action, timestamp data of when the action occurred, wins and losses, player movement, game statistics, etc. The event data and other media metadata can be used with other information, facts, statistics associated with a user of the activity to provide insights and other correlations between the event data.

Figure 7:
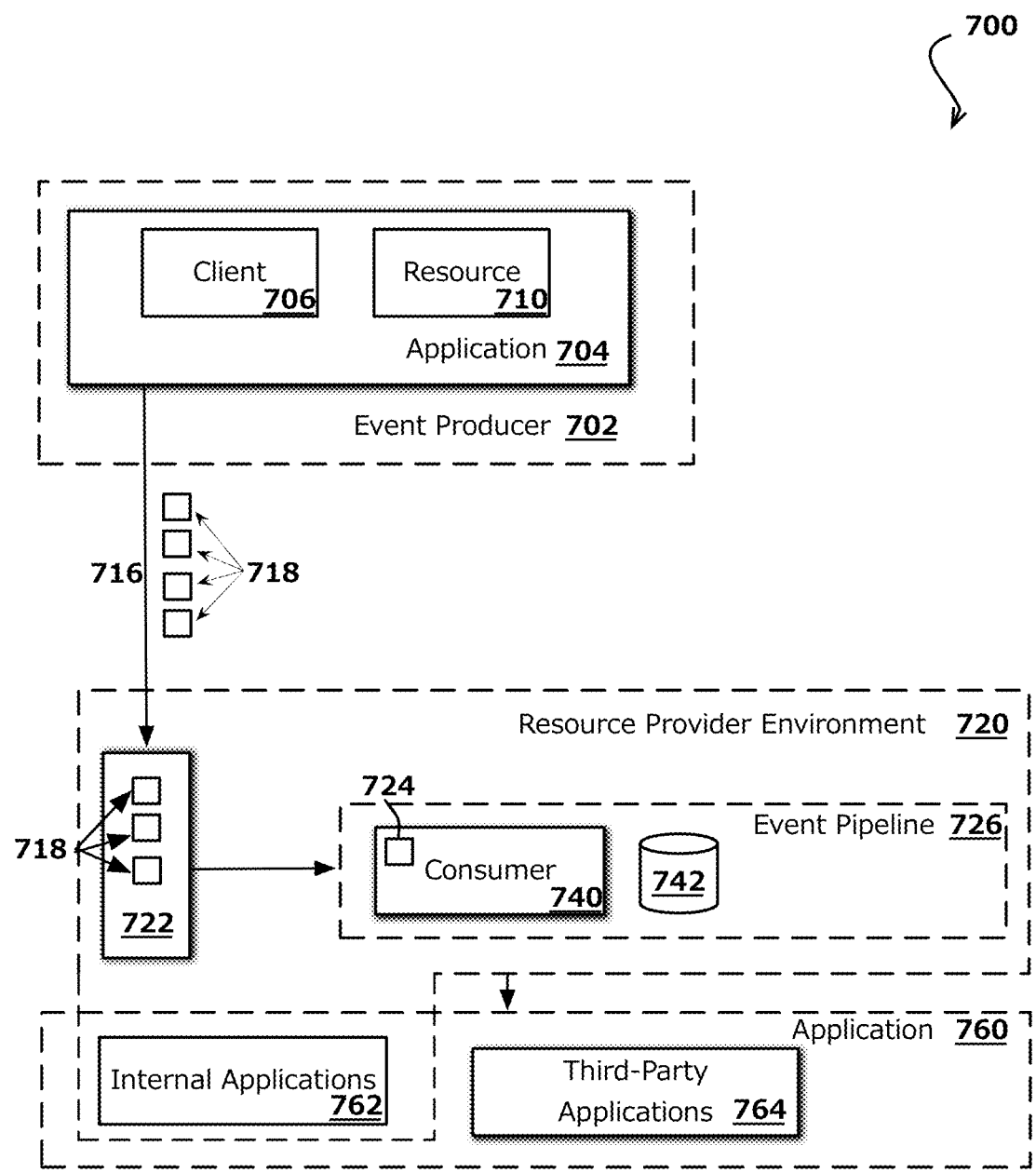
FIG. 7 illustrates an example resource environment for determining event data that can be used in accordance with various embodiments.

FIG. 7 illustrates an example resource environment 700 for determining fine-grained player behavior in sporting, gaming, or other such activities in accordance with an embodiment. While various approaches described determining such behavior, in accordance with various embodiments, player behavior and associated data can be obtained from one of a number of third-party systems. In this example, various event producers 702 are generating telemetry data as they execute. In an embodiment, a number of event producers 702 is dynamically configurable; for example, event producers may be dynamically generated at any time and begin sending events 718 to an event queue 722, as described herein. Telemetry may generally be considered a data collection process, where data are collected from remote devices (e.g., processes, sensors, etc.) and transmitted to receiving equipment for monitoring, storage, etc. In various embodiments, telemetry (e.g., event-based telemetry) may encompass one or more events recognized from image and/or video data, and/or sent from event producers such as application 704 and associated resource(s) 710. In the context of a sporting event or online game, the events may be coarse-grained events like games won to fine-grained events such as three-point attempts. A single event may be considered a single occurrence that happened at a discrete moment of time and that may comprise various data, such as metadata, attributes, metrics, etc. An event determined using an event recognition approach, such as one determined using a neural network or other machine-learning based approach, may be considered a "real-time event" 718. An event generated by, or otherwise associated with an application 704 or related resource 710 may be considered an "application-related event". For any such event, the term "event" may also be used synonymously.

In an embodiment, an event producer may include an image or video producer, media application (e.g., gaming, video, etc.) or the like. As an example, an event producer may include image or video capturing application 704 that includes one or more clients 706 such as video recording devices, game consoles, computing devices, mobile phones, etc., that are executing a media client 706 corresponding to the media application 704. An example of an event producer 702 comprising the various components illustrated in FIG. 7 is a network media environment, a multi-player gaming environment, etc. Those of skill in the art will also understand that while the techniques discussed herein may be used in various computing environments where telemetry data and/or events are being gathered and transmitted over a network.

In an embodiment, examples of events in the context of a sporting event may be "player X made a three pointer," "player Y attempted a two pointer," "player X fouled player Y," and so forth. The number and types of events are not expressly limited; an event, as discussed herein, can be something that happened at a discrete moment of time; for example, a frame of visual content (e.g., a frame of a game display, a video frame of streaming media, etc.), which may be referenced in the event with timestamp data.

According to one embodiment, event producer 702 may produce a stream 716 of events 718 that may be transmitted, such as over a network, to various components as described herein. While in the example of FIG. 7, event producer 702 is shown as being in a separate component from the resource provider environment 720 and the applications 760, in various embodiments, one or more components may be located in the same environment (e.g., one or more of the applications 760, such as the internal applications 762 may be executing in the resource provider environment 720, while third-party applications 764 may be executing outside of the resource provider environment, etc.) or be communicatively coupled to various components in alternative arrangements, or additional or fewer components/environments may be utilized.

Event 718 is received, for example at an event queue 722. In one embodiment, event queue 722 may comprise one or more processes (e.g., applications, services such as an "Event Transaction Service," virtual machines, etc.) executing at a resource provider environment 720, which may comprise a multi-tenant computing environment. The event queue 722 in various embodiments may be considered a service that provides an entry point for events; for example, a streaming queue that receives data (e.g., events) from event producers and multiplexes the incoming data stream across a number of data sinks/consumers (e.g., event pipelines, applications, etc.) 740. While the event queue 722 in FIG. 7 is illustrated as separate from other components such as event pipeline 726, it should be understood that example systems may comprise a single component that performs multiple functionality, or other arrangements of various components (e.g., more or fewer components of different types), without affecting the efficacy of techniques described herein.

According to one embodiment, one or more event processing pipelines 726 may be provided, the number of which may be dynamically configurable as described with respect to event producers 702 above, that receive some number of events 718 received by event queue 722. Each event pipeline 726 may in various examples perform different processing on the events 718 it receives (e.g., send an event to storage, drop the event if is it of a type that the pipeline is not interested in, etc.), and in one embodiment may receive a different subset (or all, in some cases) of the events 718. In that embodiment, a decision on which events 718 received at the event queue 722 are to be directed to event pipeline 726 may be controlled by an event policy 724, which in various embodiments is associated with event pipelines 726 and may be stored at, communicably coupled with, or otherwise embodied in event queue 722. In other embodiments, the event policy 724 may be stored in a different location, such as with the event pipeline 726.

An event can be recognized using an object recognition approach, such as one determined using a neural network or other machine-learning based approach from captured images and/or video. For example, media data can be analyzed using a neural network or other such approach to determine events in the media data such as three points shots, sport configurations, and other insights. In an example, training data (e.g., media data) can be obtained to train one or more neural networks to recognize sporting event actions. The training data can include media data, event data, and description of that data. The media data and event data can come from one or more sources as described herein, such as from content providers, the Internet, or a social media site, and can include representations of various different types of events, game strategy, etc. In accordance with various embodiments, the media data can include image data, audio data, gesture data, biometric data, for example, and the event data can include fine-grained behavior for a particular event.

In order to function as training data for one or more neural networks, or other such machine learning algorithms, etc., at least some of the media data will include (or be associated with) data that indicates a type or classification of actions represented in individual media. For example, media data including a three-point attempt might include metadata such as "three-point attempt" or other such classification.

In at least some embodiments there is one neural network trained for each type of event, with multiple types of classifications of that type of event being possible outcomes from the network. In some embodiments a portion of the training set will be retained as a testing set to use to test the accuracy of the trained neural network. In this example, the training images are accessible to a training module which can feed the media data to a neural network in order to train the network. As mentioned, the media data and classification data will be fed to the neural network, so the neural network can learn features of media data associated with different classifications of game actions. The network can then learn various combinations or relations of features for different classifications, such that when query media data is processed with the trained neural network the network can recognize the features and output the appropriate classification, although various other approaches can be utilized as well within the scope of the various embodiments.

In some embodiments the training data is to be used as training data for a convolutional neural network or other deep neural network. As mentioned, the media data can be classified, either when provided or through a classification analysis, to determine a primary classification, such as free throw, layup, etc. Various other media data provided by third party sources can be used for training as well as discussed and suggested elsewhere herein. The neural network can be trained using some or all of the designated training data. Once at least the initial training has completed, a testing module can utilize the testing media data to test the trained neural network. Since the testing media data already includes classification data, the classifications generated by the neural network can be compared against that data to determine the accuracy of the neural network, both overall and for different categories of emotions. The testing media data can also be used to further train the neural network. The results can be analyzed and if the results are acceptable, such as where the accuracy at least meets a minimum accuracy threshold for some or all of the classifications, the neural network can be provided to a recognizer that is able to accept query media data (e.g., an image of a sporting action) from various sources, such as customers or end users, and generate classifications for sporting actions represented in that media data.

In some embodiments, order to determine insights and other correlations between event-based telemetry such as sporting event actions and event playing strategy, the neural network can be trained to recognize correlations between event data and event strategy relating to the sporting event. The correlations between sporting event strategy and sporting events can how best to score the next point, win the game, etc. Accordingly, approaches in accordance with various embodiments can attempt to train one or more neural networks or other machine learning algorithms for recognizing insights between event data and event strategy data for a particular sporting event. In a first phase, the neural network can be trained on media data. In a second phase, the neural network can be trained to determine insight information for particular event data. In this example, training media data is used to train a neural network or other such network for recognizing strategy in media data. The neural network or other such network is trained on event data that includes various sport actions or other behavior data. In order to function as training data at least some of the event data will include (or be associated with) data that indicates a type or classification of strategy associated with particular events. In this way, the trained neural network is optimized to learn various combinations or relations of features for different classifications, such that when query event data is processed with the trained neural network the network can recognize the event and output the appropriate insights, although various other approaches can be utilized as well within the scope of the various embodiments.

Figure 8:
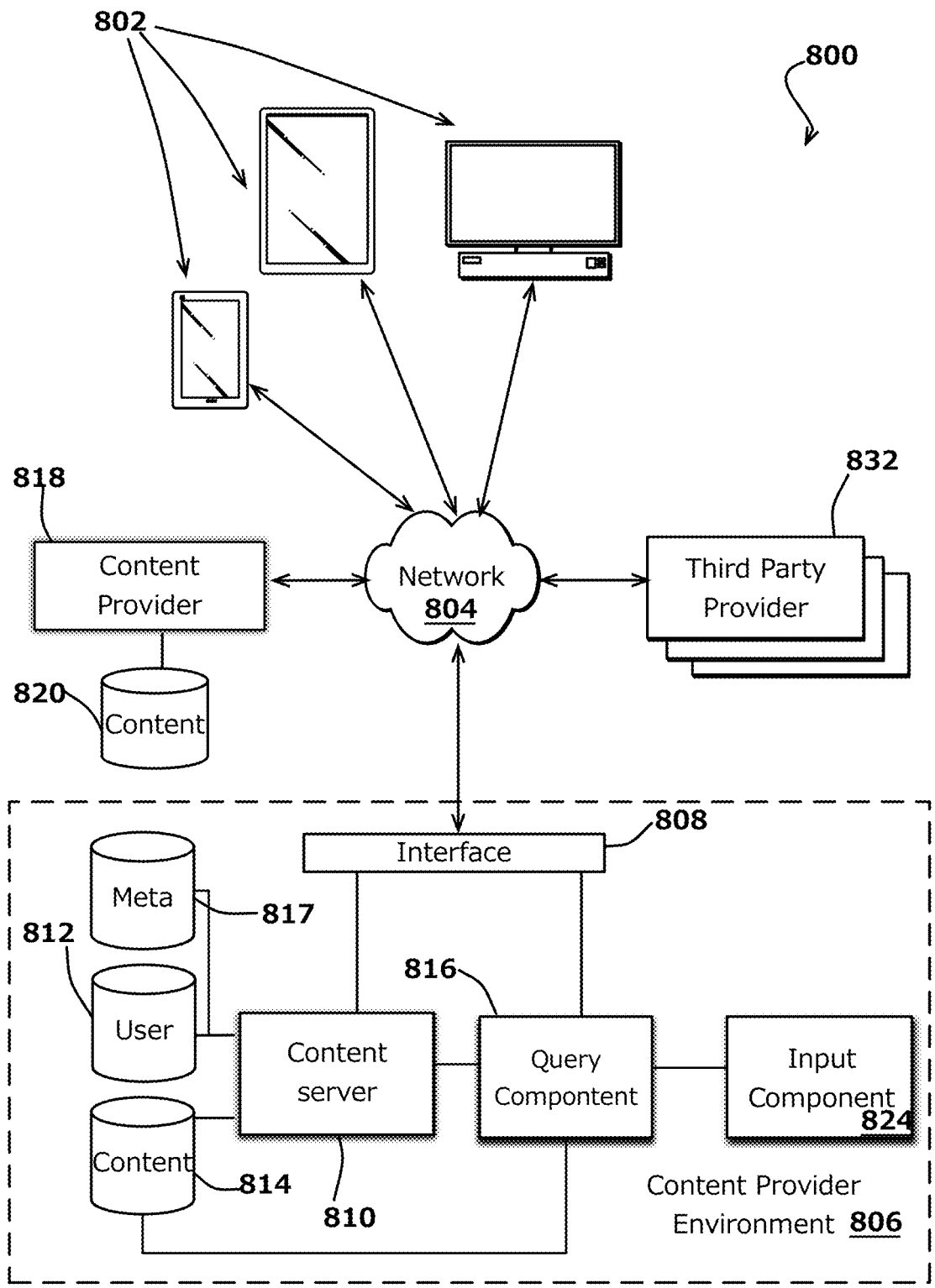
FIG. 8 illustrates an example environment in which aspects of the various embodiments can be implemented.

FIG. 8 illustrates an example environment 800 in which aspects of various embodiments can be implemented. In this example, users are able to utilize various types of electronic devices 802 to request delivery of content over at least one network 804 to be received by a content provider environment 806. As mentioned, in at least some embodiments the request can include information for user input data, spatial input data, among other types of data. The network(s) can include any appropriate network, such as the Internet, a local area network (LAN), a cellular network, an Ethernet, or other such wired and/or wireless network. The content provider environment 806 can include any appropriate resources for providing content from a resource provider, as may include various servers, data stores, and other such components known or used for providing content from across a network (or from the "cloud").

In this example, the users can have an account with a content service provider associated with the content service provider environment 806. In some embodiments, the user can subscribe to the content service provider in order to obtain the rights to access various instances of content.

A request for content can be received to an interface layer 808 of the content provider environment 806, which can include components such as APIs, Web servers, network routers, and the like. The request can be generated based on input from a user, including voice inputs, device inputs, gesture inputs, among other such inputs. The request can also include spatial input data, among other types of data. The components can cause information for the request to be directed to a content server 810, or other such component, which can analyze information for the request to determine whether to grant access to the content identified in the request. In some embodiments, this can include validating a user credential to verify that the user has a current account that enables access to the requested content in the manner requested. This can involve, for example, comparing the credential against information stored for the user in a user data store 812 or other such location.

Information for the request can also be provided to input component 824, which is configured to analyze information for the request to determine at least a type of input identified in the request. For example, in various embodiments, a user can interact with a computing device, by tilting, rotating, or otherwise changing the orientation of the device, or performing a gesture (e.g., waving at the device) or touch input to adjust a magnification level. Thus, a magnification level can be determined based on the computing device and provided to input component 824 or otherwise determined by input component 824 based on the information.

The magnification level and other information can be directed to query component 816, which can use the information and magnification level to adjust values of data selection criteria to determine the presentation of content. An example of data selection criteria can include a range criteria and a scale criteria. In an example, a change in the magnification level can change the values of the data selection criteria. For example, query component 816 can use one or more query functions that consider the data selection criteria to select appropriate content and the layout of that content from content store 814. In this example, content data store 814 can include source data from content networks, social media networks, news networks, gaming networks and/or games, and various other third-party providers 832 of content. The source data can be associated with a data structure, as well as other such metadata. The data structures can be traversed to select appropriate content based on one or more of a number of attributes used to structure the data, such as a time attribute, a size attribute, etc. The query functions can use the information from the request to determine a value appropriate to traverse at least one data structure to obtain content to present. Information for the content, including content layout information, can then be provided to content server 810 in order to locate the appropriate content and provide that content for display on the client device 802. In some cases, the content server can provide the content directly, such as from data store 814 of the content provider environment 806. In other cases, the content service provider might send a request to content provider 818, which might be a producer of the content or another such entity, system, or service, which can cause the content to be transferred from a respective content repository 820. Various other approaches to enabling content to be provided for display on various client devices can be utilized as well in accordance with various embodiments.

In an embodiment, a magnification level from an electronic device 802, query component 816 or other such component can use the magnification level to determine a plurality of paths through a hierarchical tree of functions used to filter or otherwise select content. As described, the plurality of paths can correspond to content to be displayed for a particular level of detail for an interface and determined based at least in part by traversing the hierarchical tree from a highest level until reaching the appropriate node. For example, the magnification level can be received for a first level of detail. The magnification level can be mapped or otherwise converted to a value, such a time value, location value, size value, etc. based at least in part on the context of an application and other appropriate conversion technique. Based on the property value determined from the magnification level, a first query function can be applied to determine a portion of content of a second content type. Content portions of the second content type can be associated with a second function, and the value can be used by the second function to determine content for a third content type. The process can continue until the property value does not return content for a particular function. Thereafter, content server 810 can cause a presentation of content to be generated that includes the determined content. Although query component 816, content server 810, and the input component 824 are shown as single components, these component may be hosted on multiple server computers and/or distributed across multiple systems. Additionally, one or more of these components may be performed by any number of different computers and/or systems. Thus, these components may be separated into multiple services and/or over multiple different systems to perform the functionality described herein. In various embodiments, one or more of these components, and other such components in environment 806 or at least functions performed by such components can be included in, for example, a client device such as electronic device 802.

In some embodiments, an offline process can be used to identify potential objects of interest in the content. This can be performed by the content service provider or another appropriate entity. Potential content of interest can be identified by these entities, or in some embodiments by monitoring the content selected by users as potentially being of interest, in order to crowd source the content selections. While this process can be performed automatically in some embodiments, the process can be manually initiated in order to reduce processing requirements. In this example, information describing the content of interest can be stored in a location such as a metadata repository 817 or user data store 812, which can be used to determine appropriate content for the user.

Figure 9:
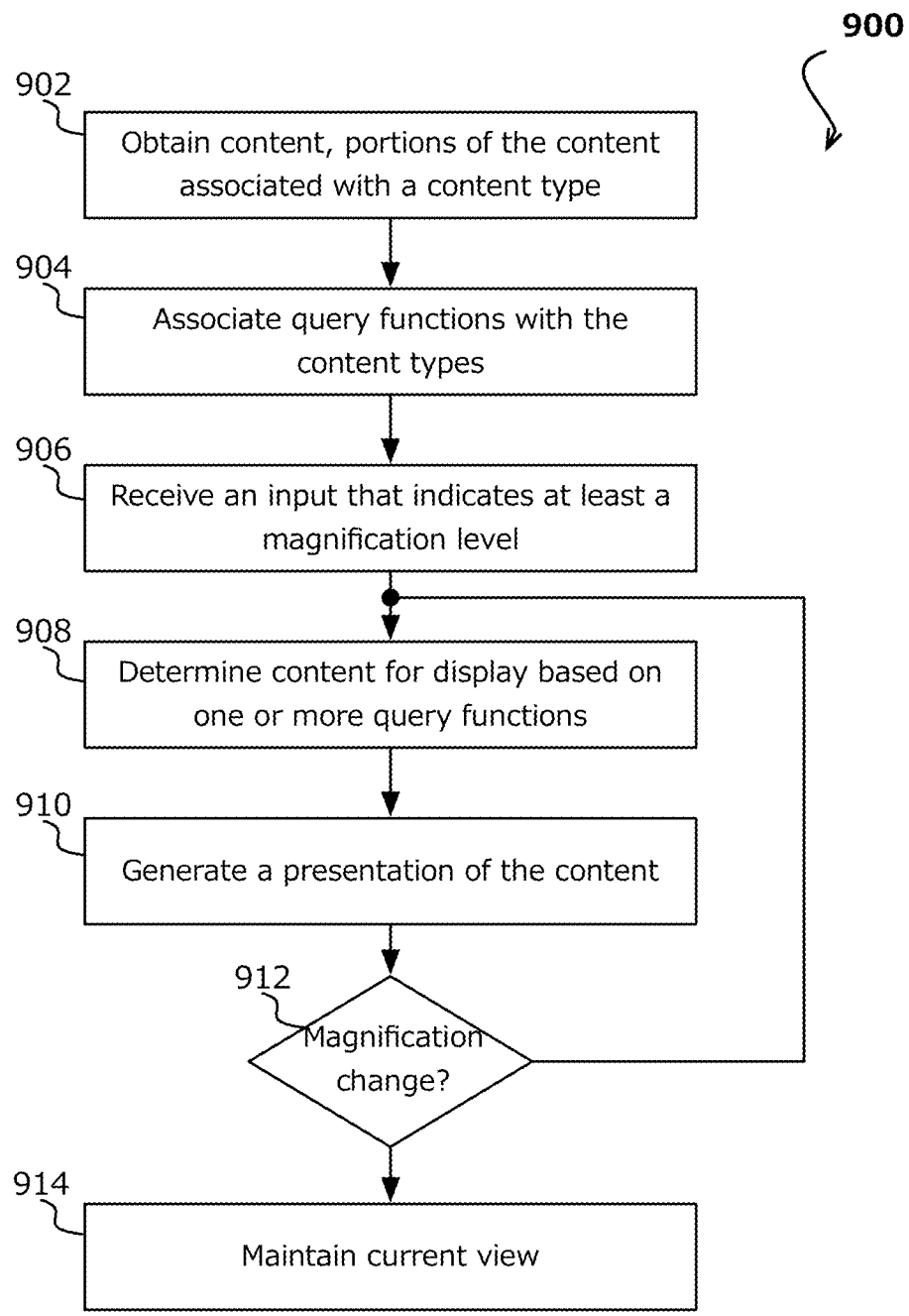
FIG. 9 illustrates an example process for adjusting a presentation content in accordance with various embodiments.

FIG. 9 illustrates an example process 900 for adjusting a presentation of displayed content in accordance with various embodiments. It should be understood that, for any process discussed herein, there can be additional, fewer, or alternative steps performed in similar or alternative orders, or in parallel, within the scope of the various embodiments unless otherwise stated. In this example, content is obtained 902 from a content provider. In an example, the content can include images, videos, data files, etc. for one or more sporting events and can describe aspects of the sporting events such as team schedules, team statistics, player statistics, and the like. Portions of the content can be associated with a content type. For example, one portion of the content might be associated with a team and can reference a list of players, team schedule, team statistics, and the like. The content type can be provided by the content provider, a third party, determined once received by a processing component, or a combination thereof.

Query functions can be associated 904 with content types, where a query function is operable to select content of a particular content type based on a property value associated with the content. Example properties include time, location, size, etc. In certain embodiments, the content selected using a function can be based on additional information, such as user profile (or default user profile) information that identifies user viewing behavior, user preferences, or user favorites; device location information; device time zone information; user behavior models describing a user's viewing patterns or media consumption patterns; and/or spatial input data identifying a screen size, screen orientation, display screen dimensions and/or shape, etc. The additional information can be used to assign weights to query functions, and the weighted query function can be used to determine tailored content and content layout as the magnification level changes.

In an embodiment, associating a query function to a content type can be based on mapping information, for example, a lookup table, rules, or other information that relates a query function with a content type. In an embodiment, query functions can be organized in a continuous structure, such as a hierarchal tree structure, a series structure, and the like. In an embodiment, nodes in the hierarchical tree structure can correspond to a portion of the content, where individual levels of the hierarchical tree structure can correspond to a content type. In this example, the individual nodes can be associated with a view template or other such model or information to determine a layout of content for presentation of a display screen.

An input can be received 906. As described, the input can include voice inputs, device inputs, gesture inputs, etc. In this example, the input indicates a magnification level for a display of content on a display screen of a computing device. The magnification level can be used to determine 908 content for display based on one or more query functions.

For example, the magnification level can be used to determine a plurality of paths through the hierarchical tree, the plurality of paths corresponding to content to be displayed for a particular level of detail for an interface and determined based at least in part by traversing the hierarchical tree from a highest level until reaching the appropriate node. In an embodiment, a magnification level can be received for a first level of detail. The magnification level can be mapped or otherwise converted to a property value, such a time property value, location property value, size property value, etc. based at least in part on the context of an application. For example, for a sport application, the property value can be a time property value. At least one query function can be applied based on the magnification level to determine content for presentation. For example, based on the property value determined from the magnification level, a first query function is applied to determine a portion of content of a second content type. Content portions of the second content type can be associated with a second function, and the property value can be used by the second function to determine content for a third content type. The process can continue until the property value does not return content for a particular function.

Thereafter, a presentation of content can be generated 910 that includes the determined content. A determination 912 can be made whether an actionable change in the magnification level is received. An "actionable" change can be an amount of change in the magnification level by more than a threshold amount. In at least some embodiments, the change must be more than a threshold amount before the portion is updated, in order to minimize "jerkiness" or small, rapid changes in the content, in order to smooth the transitions and improve the overall viewing experience.

In the situation where no input is received, the current view and magnification level can be maintained 914. In the situation where further input is received, such as a change in the magnification level, the process repeats from step 908 in order to represent the new magnification level, in order to attempt to update the displayed content. As mentioned, other settings can be specified by a user, provider, or other such entity which can affect the layout of the content in at least some embodiments. For example, as described herein, the layout of the content can be based on additional information, such as user preference, screen size, default values, etc.

Figure 10:
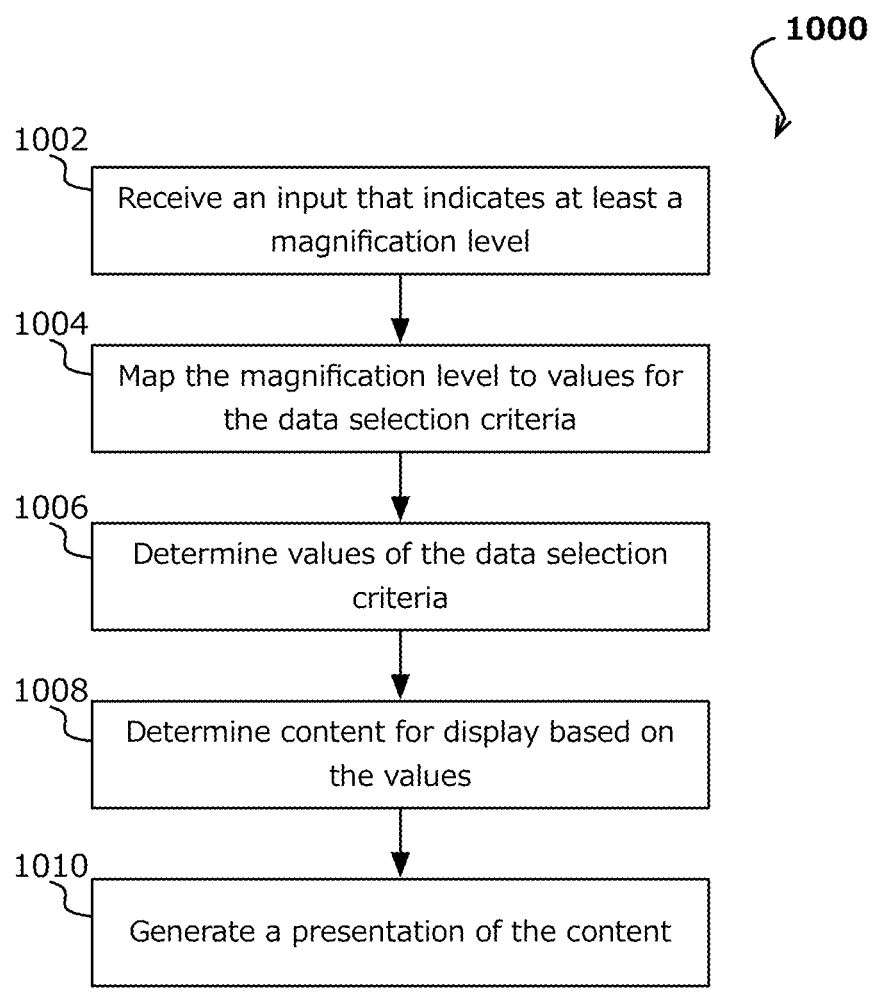
FIG. 10 illustrates an example process for adjusting a presentation of displayed content based on selection criteria in accordance with various embodiments.

FIG. 10 illustrates an example process 1000 for adjusting a presentation of content based on selection criteria in accordance with various embodiments. As with the previously discussed process, user input is received 1002 that indicates at least a magnification level. The magnification level can be mapped 1004 to a value type of values for the data selection criteria. Mapping the magnification level can be based on one or more mapping functions that consider at least a magnification level and a property value associated with the content to be displayed. An example of data selection criteria can include a range criteria and a scale criteria. The range criteria can include a first range value and a last range value. The first and last range value can be used to determine a range of values. The type of range values can include time values, price values, data size values, distance values, etc. Scale criteria can include one or more scale values. A scale value can represent an amount to adjust the range. For example, a scale value of one year will change the range of values by one year.

In various embodiments, the data selection criteria can be used for content selection (e.g., filtering, identifying, etc.) similar to the query functions described above. For example, the magnification level can be used to determine 1006 values of the data selection criteria based on at least one mapping function. The values of the data selection criteria can be used to query a data base of content to determine 1008 content for presentation. For example, portions of the content can be associated with a property value, such as a time value. Data selection criteria optimized for time values can be used to select content associated with particular time for a particular layout for a current magnification level, and the selected content can be used generate 1010 a presentation of content. Thereafter, as a user updates the magnification level, for example, in accordance with the techniques described herein, values of the selection criteria can be updated, which can be used to filter and/or select content for presentation, where the amount by which the magnification level changes based on user input can depend on various factors, such as the size of the display screen which the content is displayed, the type of content, and other such factors.

FIGS. 11A and 11B illustrate front and back views of an example electronic computing device 1100 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 1100 has a display screen 1102 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 1104 on the front of the device and at least one image capture element 1110 on the back of the device. It should be understood, however, that image capture elements could also, or alternatively, be placed on the sides or corners of the device, and that there can be any appropriate number of capture elements of similar or different types. Each image capture element 1104 and 1110 may be, for example, a camera, a charge-coupled device (CCD), a motion detection sensor or an infrared sensor, or other image capturing technology.

The device can use the images (e.g., still or video) captured from the imaging elements 1104 and 1110 to generate a three-dimensional simulation of the surrounding environment (e.g., a virtual reality of the surrounding environment for display on the display element of the device). Further, the device can utilize outputs from at least one of the image capture elements 1104 and 1110 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 1108 on the front side, one microphone 1112 on the back, and one microphone 1106 on or near a top or side of the device. In some devices there may be only one microphone, while in other devices there might be at least one microphone on each side and/or corner of the device, or in other appropriate locations.

The device 1100 in this example also includes one or more orientation- or position-determining elements 1118 operable to provide information such as a position, direction, motion, or orientation of the device. These elements can include, for example, accelerometers, inertial sensors, electronic gyroscopes, and electronic compasses.

The example device also includes at least one communication mechanism 1114, such as may include at least one wired or wireless component operable to communicate with one or more electronic devices. The device also includes a power system 1116, such as may include a battery operable to be recharged through conventional plug-in approaches, or through other approaches such as capacitive charging through proximity with a power mat or other such device. Various other elements and/or combinations are possible as well within the scope of various embodiments.

FIG. 12 illustrates a set of basic components of an electronic computing device 1200 such as the device 1100 described with respect to FIG. 11. In this example, the device includes at least one processing unit 1202 for executing instructions that can be stored in a memory device or element 1204. As would be apparent to one of ordinary skill in the art, the device can include many types of memory, data storage, or computer-readable media, such as a first data storage for program instructions for execution by the processing unit(s) 1202, the same or separate storage can be used for images or data, a removable memory can be available for sharing information with other devices, and any number of communication approaches can be available for sharing with other devices.

The device typically will include some type of display element 1206, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1208, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1200 also includes at least one orientation determining element 1210 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1200. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1212 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 1214 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1216, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input element 1218 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

The various embodiments can be implemented in a wide variety of operating environments, which in some cases can include one or more user computers or computing devices which can be used to operate any of a number of applications. User or client devices can include any of a number of general-purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the internet, an intranet, an extranet, a public switched telephone network, an infrared network, a wireless network and any combination thereof.

In embodiments utilizing a web server, the web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random-access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or web browser. It should be appreciated that alternate embodiments may have numerous variations from that described above. For example, customized hardware might also be used, and/or particular elements might be implemented in hardware, software (including portable software, such as applets) or both. Further, connection to other computing devices such as network input/output devices may be employed.

Storage media and other non-transitory computer-readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A computing system, comprising:
   a computing device processor; and
   a memory device including instructions that, when executed by the computing device processor, enables the computing system to:
   obtain content from a content provider, the content capable of being displayed for a plurality of presentation levels, individual presentation levels of the plurality of presentation levels associated with a content type;
   enable for the individual content types, a function, respective functions operable to, based on a magnification level, set values for data selection criteria used to select portions of the content;
   receive an input that indicates the magnification level for a first portion of the content being displayed on a display screen of a computing device, the magnification level being a value that quantifies an amount of zoom, the first portion of the content being displayed for a first presentation level and associated with a first content type, the content type associated with a first function;
   use the first function to set first values for a first set of data selection criteria;

determine a second portion of the content of a second content type based on the first values, the second content type associated with a second function;

use the second function to set second values for a second set of data selection criteria;

determine a third portion of the content of a third content type based on the second values, the third content type associated with a third function, wherein the third function fails to determine an additional portion of the content for the magnification level, and wherein the first content type, the second content type, and the third content type are different content types; and generate a presentation of the first portion of the content and the second portion of the content at a second presentation level.

2. The computing system of claim 1, wherein the instructions, when executed by the computing device processor, further enables the computing system to:

receive a change in the magnification level; and determine updated content for display based on the change in the magnification level and at least one function of a plurality of functions.

3. The computing system of claim 1, wherein the instructions, when executed by the computing device processor, further enables the computing system to:

obtain additional input data; and assign weights to the first function to generate a weighted function, the weighted function operable to determine tailored content.

4. The computing system of claim 1, wherein the instructions, when executed by the computing device processor, further enables the computing system to:

use mapping information to associate the first function with at least one content type.

5. The computing system of claim 1, wherein a plurality of functions is organized in one of a hierarchical tree structure or a series structure, and wherein nodes in the hierarchical tree structure correspond to portions of the content and individual levels of the hierarchical tree structure correspond to content of a particular content type.

6. The computing system of claim 1, wherein the input is at least one of a touch-based input received at a display, an audio input received from a user, a gaze input detected from a gaze direction of a user, or a gesture input received from the user.

7. The computing system of claim 6, wherein the audio input is associated with an audible command to alter the magnification level.

8. The computing system of claim 1, wherein the instructions, when executed by the computing device processor, further enables the computing system to:

detect two inputs at the display screen at substantially a same time for initial locations, wherein a change in a relative location between the two inputs corresponds to the magnification level.

9. The computing system of claim 1, wherein the input is associated with one of user preference input data, user device location input data, user device screen dimension input data, user device screen orientation input data, or user device view coordinate input data.

10. A computer-implemented method, comprising:

obtaining content from a content provider, the content capable of being displayed for a plurality of presentation levels, individual presentation levels of the plurality of presentation levels associated with a content type;

enable for the individual content types, a function, respective functions operable to, based on a magnification level, set values for data selection criteria used to select portions of the content;

receiving an input that indicates the magnification level for a first portion of the content being displayed on a display screen of a computing device, the magnification level being a value that quantifies an amount of zoom, the first portion of the content being displayed for a first presentation level and associated with a first content type, the content type associated with a first function;

using the first function to set first values for a first set of data selection criteria;

determine a second portion of the content of a second content type based on the first values, the second content type associated with a second function;

using the second function to set second values for a second set of data selection criteria;

determining a third portion of the content of a third content type based on the second values, the third content type associated with a third function, wherein the third function fails to determine an additional portion of the content for the magnification level, and wherein the first content type, the second content type, and the third content type are different content types; and generating a presentation of the first portion of the content and the second portion of the content at a second presentation level.

11. The computer-implemented method of claim 10, further comprising:

obtaining weighting data; and assigning weights to the first function to generate a weighted function based on the weighting data, the weighted function operable to tailor at least the first portion of the content.

12. The computer-implemented method of claim 10, further comprising:

use mapping information to associate the first function with at least one content type.

13. The computer-implemented method of claim 10, wherein the input is at least one of a touch-based input received at a display, an audio input received from a user, a gaze input detected from a gaze direction of a user, or a gesture input received from the user, and wherein the audio input is associated with an audible command to alter the magnification level.

14. The computer-implemented method of claim 10, further comprising:

receiving a change in the magnification level; and determining updated content for display based on the change in the magnification level.

15. The computer-implemented method of claim 10, further comprising:

detecting two inputs at the display screen at substantially a same time for initial locations, wherein a change in a relative location between the two inputs corresponds to the magnification level.

16. A non-transitory computer readable storage medium storing instructions that, when executed by at least one processor of a computing system, causes the computing system to:

obtain content from a content provider, the content capable of being displayed for a plurality of presentation levels, individual presentation levels of the plurality of presentation levels associated with a content type;

enable for the individual content types, a function, respective functions operable to, based on a magnification level, set values for data selection criteria used to select portions of the content;

receive an input that indicates the magnification level for a first portion of the content being displayed on a display screen of a computing device, the magnification level being a value that quantifies an amount of zoom, the first portion of the content being displayed for a first presentation level and associated with a first content type, the content type associated with a first function;

use the first function to set first values for a first set of data selection criteria;

determine a second portion of the content of a second content type based on the first values, the second content type associated with a second function;

use the second function to set second values for a second set of data selection criteria;

determine a third portion of the content of a third content type based on the second values, the third content type associated with a third function, wherein the third function fails to determine an additional portion of the content for the magnification level, and wherein the first content type, the second content type, and the third content type are different content types; and generate a presentation of the first portion of the content and the second portion of the content at a second presentation level.

17. The non-transitory computer readable storage medium of claim 16, wherein the instructions, when executed by the at least one processor, further enables the computing system to:
   obtain weighting data; and
   assign weights to the first function to generate a weighted function based on the weighting data, the weighted function operable to tailor at least the first portion of the content.

18. The non-transitory computer readable storage medium of claim 16, wherein the instructions, when executed by the at least one processor, further enables the computing system to:
   receive a change in the magnification level; and
   determine updated content for display based on the change in the magnification level.

19. The non-transitory computer readable storage medium of claim 16, wherein the instructions, when executed by the at least one processor, further enables the computing system to:
   use mapping information to associate the first function with at least one content type.

20. The non-transitory computer readable storage medium of claim 16, wherein the input is at least one of a touch-based input received at a display, an audio input received from a user, a gaze input detected from a gaze direction of a user, or a gesture input received from the user, and wherein the audio input is associated with an audible command to alter the magnification level.

* * * * *